(12) United States Patent
Albeck et al.

(10) Patent No.: US 8,561,780 B2
(45) Date of Patent: Oct. 22, 2013

(54) IMMERSION TREATMENT SYSTEM

(75) Inventors: Sebastian Albeck, Puebla (MX);
Antonio Espinosa, Puebla (MX); Victor Gonzalez, Puebla (MX); Juergen Hanf, Tuebingen (DE); Joerg Robbin, Pfaeffingen (DE)

(73) Assignee: Eisenmann AG (DE)

( * ) Notice: Subject to any disclaimer, the term of this patent is extended or adjusted under 35 U.S.C. 154(b) by 565 days.

(21) Appl. No.: 12/810,422

(22) PCT Filed: Nov. 29, 2008

(86) PCT No.: PCT/EP2008/010145
§ 371 (c)(1),
(2), (4) Date: Aug. 20, 2010

(87) PCT Pub. No.: WO2009/083081
PCT Pub. Date: Jul. 9, 2009

(65) Prior Publication Data
US 2010/0326832 A1 Dec. 30, 2010

(30) Foreign Application Priority Data

Dec. 28, 2007 (DE) .......................... 10 2007 063 061
Feb. 21, 2008 (DE) .......................... 10 2008 010 399

(51) Int. Cl.
*B05C 3/09* (2006.01)
*B65G 49/02* (2006.01)

(52) U.S. Cl.
USPC ......... 198/346.3; 118/409; 118/416; 118/423

(58) Field of Classification Search
USPC ............ 198/346.3, 378, 465.4; 118/409, 416, 118/423, 425, 426, 428
See application file for complete search history.

(56) References Cited

U.S. PATENT DOCUMENTS 3,699,918 A 10/1972 Garrison
4,772,374 A * 9/1988 Urquhart et al. .............. 204/625
(Continued)

FOREIGN PATENT DOCUMENTS

DE 29 02 352 A1 7/1980
DE 2936925 A1 3/1981
(Continued)

*Primary Examiner* — Douglas Hess
(74) *Attorney, Agent, or Firm* — Factor Intellectual Property Law Group, Ltd.

(57) ABSTRACT

The invention relates to an immersion treatment system, particularly an electrophoretic immersion coating system, comprising at least one immersion basin in a known manner that can be filled with a treatment fluid. A transport system guides the objects to be coated to the immersion basin, into the interior of the immersion basin, out of the immersion basin, and away therefrom. It comprises at least one transport car whereon a vertically displaceable carriage is disposed. A component defining a rotary axis is supported on the same, supporting a mounting device for the object to be treated. A motion sequence for the object can be achieved in said manner, comprising a superposition of a horizontal linear motion, a vertical linear motion, and a rotary motion about the rotary axis.

18 Claims, 38 Drawing Sheets

(56) References Cited

U.S. PATENT DOCUMENTS

| | | | |
|---|---|---|---|
| 5,531,830 A | 7/1996 | Ichinose et al. | |
| 5,725,669 A * | 3/1998 | Heckmann | 118/423 |
| 6,676,755 B2 * | 1/2004 | Ehrenleitner et al. | 118/423 |
| 6,706,117 B2 * | 3/2004 | Ehrenleitner et al. | 118/423 |
| 6,857,529 B2 * | 2/2005 | Lopez Alba | 212/273 |
| 6,902,051 B2 * | 6/2005 | Dehne et al. | 198/346.3 |
| 6,991,087 B2 * | 1/2006 | Krannich et al. | 198/465.1 |
| 7,238,392 B2 * | 7/2007 | Kyotani | 427/430.1 |
| 7,270,134 B2 | 9/2007 | Muller et al. | |
| 2003/0140952 A1 | 7/2003 | Muller et al. | |

FOREIGN PATENT DOCUMENTS

| | | |
|---|---|---|
| DE | 10306826 A1 | 4/2004 |
| EP | 1 319 444 A2 | 6/2003 |
| JP | 3002397 A1 | 1/1991 |
| JP | 2005026596 A1 | 1/2005 |

* cited by examiner

IMMERSION TREATMENT SYSTEM

RELATED APPLICATIONS

This application claims the filing benefit of International Patent Application No. PCT/EP2008/010145, filed Nov. 29, 2008, which claims the filing benefit of German Patent Application No. 10 2007 063 061.3 filed Dec. 28, 2007, the contents of both are incorporated herein by reference.

TECHNICAL FIELD

The invention relates to an immersion treatment system, having
a) at least one immersion bath which can be filled with a treatment liquid and in which the objects to be treated, in particular vehicle bodies, can be immersed;
b) a conveyor system which can bring the objects to be treated to the immersion bath, put them into the interior of the immersion bath, take them out of the immersion bath and move them away therefrom and which includes at least one transport carriage which has a securing device that can be rotated about an axis of rotation and to which at least one object may be secured.

BACKGROUND OF THE INVENTION

An immersion treatment system of this kind, in the specific form of an electrophoretic immersion coating system, is known from DE 101 03 837 B4. In this case, each transport carriage includes at least one pivotal arm which at one end is pivotal about a first axis of rotation that moves with the transport carriage and at the other end carries, by way of a second axis of rotation, the securing device to which the object to be coated is secured. The movement by means of which the vehicle body is immersed in the immersion bath in this case may be regarded as a superposition of two rotary movements about the two said axes of rotation and a translational linear movement in the horizontal direction. This known immersion coating system is capable of extremely broad variability in respect of the kinematic movements it can achieve, and a high degree of flexibility. However, this has to be obtained at the expense of a certain complexity in the apparatus, since the different structural elements that carry the securing device and hence the object to be coated are subject to relatively high loading.

An earlier immersion coating system is described in DE 196 41 048 C2. In this case, the conveying device is constructed such that the objects to be treated are immersed in the baths and raised out of them again with the superposition of a purely translational movement and a purely rotary movement about an axis which is aligned perpendicular to the direction of transport. Here, the axis of rotation must lie relatively far outside the contour of the vehicle body and hence far from the centre of gravity thereof. In the case of objects to be coated which have considerable weight, very complex mounting frames are required here since the forces produced are large. Moreover, only a single kinematic arrangement is possible when the objects are immersed in and emerge from the bath.

The present invention is directed to resolving these and other matters.

SUMMARY OF THE INVENTION

An object of the present invention is to construct an immersion treatment system of the type mentioned at the outset such that the complexity of the apparatus is reduced while retaining as much variability in its kinematic movements and flexibility as possible.

This object may be achieved according to the invention, in that
c) the transport carriage includes a vertically movable slide on which the component that defines the axis of rotation is mounted, such that overall for the at least one object it is possible to achieve a movement sequence which is a superposition of a horizontal linear movement, a vertical linear movement and a rotary movement about the axis of rotation.

Thus, the invention does not superpose two rotary movements and one linear translational movement, as was the case in DE 101 03 837 B4 mentioned at the outset, but two linear movements which are aligned perpendicular to one another and a single rotary movement. This has the advantage that there are virtually no elements which are under flexural load; the structures which carry the vertically movable slide, and the vertically movable slide itself, are subject substantially only to tensile loading under their own weight and the weight of the object to be coated. The axis of rotation can be located such that it passes through the centre of gravity of the object to be coated or in any case in the vicinity thereof, with the result that the rotary movement about the axis of rotation can be performed with small moments of rotation.

The concept according to the invention does not mean that all the movements of the object must always be composed of a superposition of all these degrees of freedom of movement. It is sufficient if the device provides the possibility of using all three degrees of freedom of movement at the same time.

Advantageously, each transport carriage includes:
a) a drive carriage which may be moved by motor on a drive rail;
b) a holding structure which is coupled to the drive carriage and to which the slide is secured.

This construction makes it possible to use drive carriages and drive rails as are known from other application fields. It is thus possible to use all the technologies and control methods that are already in use there and which have been thoroughly tried and tested.

This is particularly true if the drive rail and the drive carriage are constructed in the manner of a conventional electric overhead conveyor.

The holding structure may be a holding carriage which has a guide frame that is guided on at least one guide rail extending in the direction of movement. In this way, the transport carriage is stabilised to prevent undesired movements. The guide rail may support a greater or lesser part of the weight of the slide and the object secured thereto.

In a particularly preferred embodiment of the invention, the drive carriage has at least one winding reel which may be rotated by motor and onto or off which at least one flexible drawing means may be wound or unwound, the lower end of this flexible drawing means being connected to the vertically movable slide. This is a particularly simple way to move the slide vertically.

As an alternative, the holding carriage may also have the winding reel which is drivable by motor on a part which is not vertically movable.

Possible flexible drawing means include in particular carrying belts or chains. The latter may be constructed such that they stiffen under pressure, with the result that they can transfer pressure forces. Then, if necessary, the suspended object may also be actively pressed below the level of the liquid, if it would otherwise float on the liquid. Appropriate chains are available commercially.

In an alternative embodiment, the holding structure may advantageously take the form of a telescopic device which may be retracted or extended in the vertical direction and which guides the slide.

The motor by means of which the component that defines the axis of rotation may be rotated is preferably arranged on the slide and is vertically movable jointly therewith. The relative geometric arrangement of the rotary motor and the axis of rotation remains unchanged in the event of vertical movements of the slide, which facilitates the transmission of moments of rotation.

If the holding carriage is rotatable in relation to the drive carriage about a substantially vertical axis, then on the return path from the exit of the immersion coating system, where the treated objects are removed, to the entry, where the objects to be treated are placed on, the transport carriage may be brought back to a position in which less space is required perpendicular to the direction of movement. This also creates a further degree of freedom for movement of the object.

At least one guide rail which cooperates with a guide member provided on the holding carriage may run along the return path of the transport carriages from the exit to the entry of the immersion treatment system. This guiding device only needs to support small forces which are sufficient to avoid uncontrolled swinging of the holding carriage in relation to the drive carriage.

The transport carriage may be set up such that the securing device may be conveyed laterally offset from the rail, at least along a section of the rail. In this way the space above the securing device and indeed the space above the object secured thereto may be kept free such that in particular no components which are required to convey the transport carriage are arranged there.

It is advantageous if the securing device includes a holding structure with securing means which is carried only by way of a side surface of a further component of the transport carriage. Unlike known overhead conveyor systems, in which the securing device is held by a bracket which extends over and above the securing device, the securing device is secured to the holding structure by only one side. Thus, and once again, no components of the transport carriage that hold the securing device are arranged above the securing device.

If the object is guided by the transport carriage suspended from the rail laterally alongside the rail, there is a risk that the transport carriage will tip in a horizontal direction towards the rail, which is caused chiefly by a force in the horizontal direction applied by the object. For this reason, it is advantageous if corresponding securing means are provided which secure the transport carriage to prevent tipping about a tilt axis parallel to the rail.

For this, the securing means may include a support structure which is arranged parallel to and below the rail and which supports the holding carriage.

The securing means may advantageously be constructed such that they include a guide roller which is mounted on the transport carriage, is rotatable about a vertical axis of rotation and is guided in a guide rail that is complementary thereto, with the guide rail running below the drive rail and parallel thereto.

BRIEF DESCRIPTION OF THE DRAWINGS

It is to be understood that the aspects and objects of the present invention described above may be combinable and that other advantages and aspects of the present invention will become apparent upon reading the following description of the drawings and detailed description of the invention.

FIG. 20 shows the immersion coating system from FIG. 1, but with a different kinematic arrangement as the vehicle bodies pass through;

DETAILED DESCRIPTION OF THE PRESENT INVENTION

Figure 1:
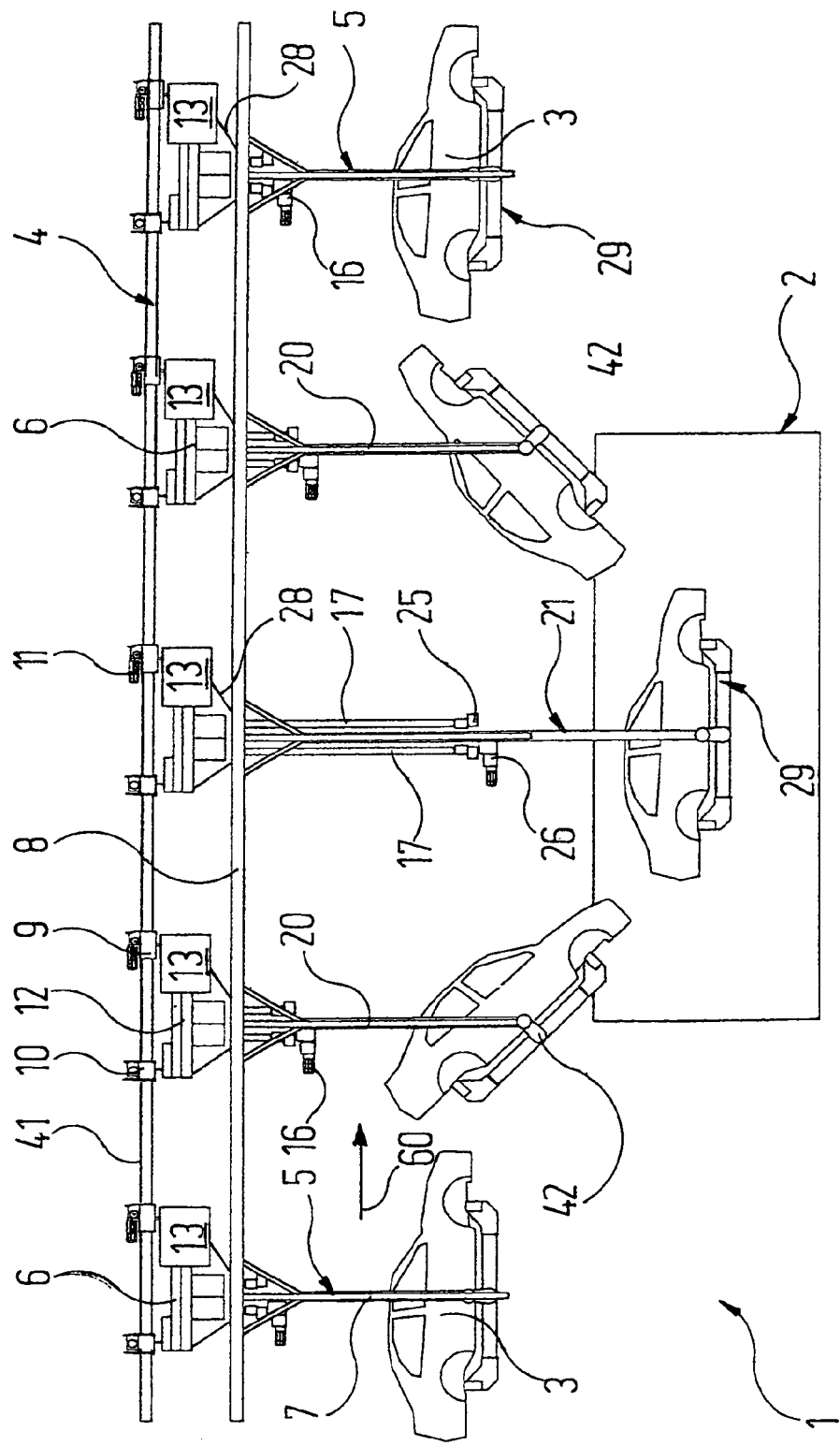
FIG. 1 shows in side view a detail of a cataphoretic immersion coating system for vehicle bodies.
Figure 2:
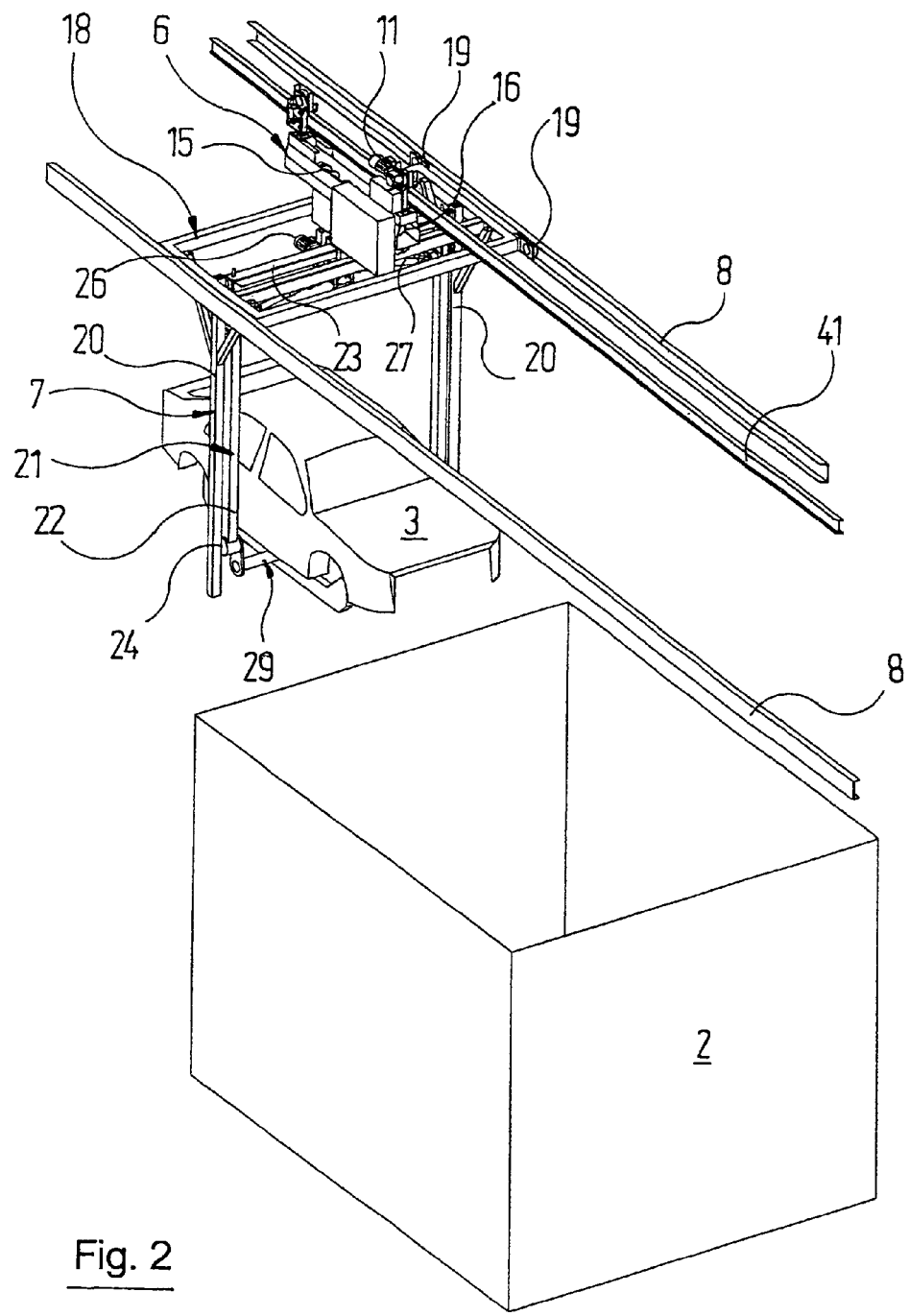
FIGS. 2 to 8 show phases in the immersion of a vehicle body in the immersion bath of the cataphoretic immersion coating system from FIG. 1, from different perspectives.
Figure 3:
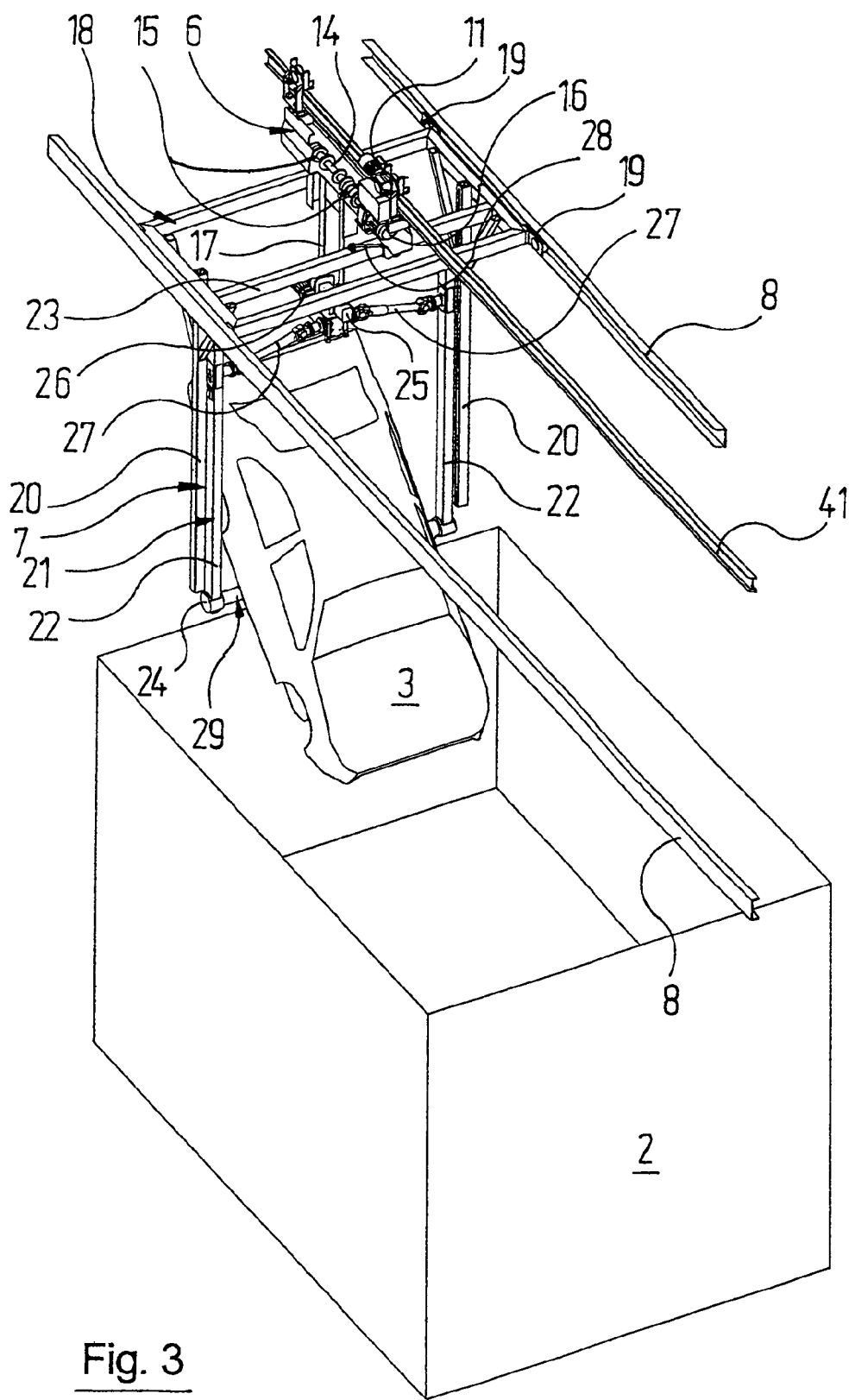

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Reference is first made to FIG. 1. The cataphoretic immersion coating system that is illustrated there, which is designated overall by the reference numeral 1, is a particular example of an immersion treatment system. It includes an immersion bath 2 which is filled with liquid paint to a particular level, in known manner. The particles of paint migrate within an electrical field, which between the objects to be coated—in the illustrated exemplary embodiment vehicle bodies 3—and anodes which are arranged along the path of movement of the vehicle bodies 3 and are not illustrated for reasons of clarity, towards the vehicle bodies 3 and are deposited thereon. Details of this procedure are generally known and are not explained here in more detail.

The vehicle bodies 3 are guided through the system, and in particular through the immersion bath 2 and the paint therein, with the aid of a conveyor system 4. This conveyor system 4 includes a plurality of transport carriages 5 which for their part have a drive carriage 6 and a retaining carriage 7 coupled thereto. A drive rail 41 having an I-shaped profile, as used in conventional electric overhead conveyors, runs approximately centrally over the immersion bath 2. Somewhat below the drive rail 41 and parallel thereto there run two guide rails 8 which are particularly readily visible in FIGS. 2 to 8.

The drive carriage 6 is basically a construction that is known from conventional electric overhead conveyors. Each of these drive carriages 6 has a travelling gear 9 which leads in the direction of movement, called the "leader" in the language of the art, and a further travelling gear 10 which follows in the direction of movement and is called the "trailer" in the language of the art. The leader 9 and trailer 10 are equipped in known manner with guide and support rollers (not illustrated) which roll on different surfaces of the I-shaped profile of the drive rail 7. At least one of the rollers of the leader 9 serves as a drive roller and for this purpose may be rotated by an electric motor 11.

The leader 9 and trailer 10 of each drive carriage 6 are connected to one another by a connection structure 12. The latter, for its part, in known manner carries a control device 13 which can communicate with the central control of the immersion coating system 1 and where appropriate with the control devices 13 of the other drive carriages 6 in the immersion coating system 1. In this way, it is possible to move the different transport carriages 5 largely independently. Between the leader 9 and the trailer 10 of each drive carriage 6 there extends a shaft 14 which is only visible in FIGS. 2 to 8 and is secured to the two winding reels 15 in such a manner that they cannot rotate in relation thereto. The shaft 14 is mounted at its opposite ends in the connection structure 12 in the region of the leader 9 and the trailer 10 and can be rotated by a winding motor 16 which once again is only illustrated in FIGS. 2 to 8 and is secured to the connection structure 12 in the region of the leader 9. By turning the shaft 14 with the aid of the winding motor 16, two carrying belts 17 can be wound onto and unwound from the winding reels 15, of which the operation will be discussed below.

Each holding carriage 7 includes a guide frame 18 in the form of a rectangle whereof the longer side extends perpendicular to the direction of movement. The short sides of the guide frame 18 carry, at their opposing ends, guide rollers 19 which run on the inner faces of the C-shaped profile of the two guide rails 8. Approximately in the central region of these two short sides there is secured a respective vertically downwardly extending guide rail 20. A slide 21 is guided vertically movably on these guide rails 20. The slide 21 is also substantially rectangular; its two vertical sides are formed by hollow guide profiles 22 which are connected to one another by a transverse crosspiece 45 at their upper ends.

A respective rotary peg 24 is mounted at the respective lower ends of the two guide profiles 22, and these rotary pegs 24 are aligned to be coaxial and in this way define an axis of rotation.

Mounted on the underside of the upper transverse crosspiece 45 of the slide 21, approximately in the centre thereof below the drive rail 7, is a short longitudinal holder 25 which is visible in the figures and to which the lower ends of the carrying belts 17 are fixed. The longitudinal holder 25 also carries a geared motor 26 whereof the output shaft is connected to the external ends of the rotary pegs 24 by way of two transmission devices 27. The transmission devices 27 each include a Cardan shaft which extends from the geared motor 26 to one of the two hollow guide profiles 22 and is there coupled to a drive mechanism (not illustrated) which extends downwards inside the hollow guide profile 22 and is coupled at the lower end thereof to the rotary shaft 24. In this way, actuating the geared motor 26 allows the rotary pegs 24 to turn in both directions of rotation.

Mounted on the outside of the guide profiles 22 are respective rollers which engage from the inside in the guide rails 20 such that the guide slide 21 is movable vertically between the guide rails 20 with little friction.

Each drive carriage 6 is connected to the associated holding carriage 7 by an obliquely extending drive rod 28 which is secured at its lower end in articulated manner to a transverse crosspiece 23 of the guide frame 18 and at its upper end in articulated manner to the connection structure 12 of the drive carriage 6 in the region of the leader 9.

Fixed to the rotary pegs 24, in each case by way of two fishplates 42, is a securing device which is designated overall by the reference numeral 29 and to which a vehicle body 3 to be coated may be detachably secured in known manner. The dimensions of the fishplates 42 are in this case such that the common axis of the rotary pegs 24 extends at least approximately through the centre of gravity of the vehicle body 3.

Operation of the cataphoretic immersion coating system 1 described above is as follows:

The vehicle bodies 3 to be coated are fed from the left in FIG. 1, in a substantially horizontal alignment (arrow 60), from a pre-treatment station in which the vehicle bodies 3 are prepared for the coating operation in known manner by being cleaned, degreased, etc. For this the slide 21 is moved to its topmost position, in which the carrying belts 17 are accordingly wound onto the winding reels 15. The corresponding position can be seen in perspective in FIG. 2. The drive carriage 6 of the corresponding transport carriage 5 is fed, with the aid of the electric motor 11, along the drive rail 41 to the immersion bath 2, the associated holding carriage 7 being drawn along with the aid of the drive rod 28. During this, the guide rollers 19 of the holding carriage 7 roll on the corresponding surfaces of the guide rails 8.

The extent to which the weight of the holding carriage 7 and the vehicle body 3 secured thereto is supported by way of the carrying belts 17 and hence ultimately by the drive rail 41 on the one hand and by way of the guide rails 8 on the other can be decided on the basis of its usefulness. In principle, it is conceivable to support this weight both exclusively by way of the drive rail 41 and exclusively by way of the guide rails 8, and by a mixture of the drive rail 41 and the guide rails 8.

When the transport carriage 5 approaches the end wall of the immersion bath 2 that is on the entry side, the slide 21 on which the vehicle body 3 is located is progressively lowered by the carrying belts 17 being unwound accordingly from the winding reels 15 with the aid of the winding motor 16. As soon as the front end of the vehicle body 3 projects beyond the end wall of the immersion bath 2 into the interior of the immersion bath 2, the rotary pegs 24 and hence the entire securing device 29 are simultaneously turned, together with the vehicle body 3, with the aid of the geared motor 26.

Thus, in this region the overall movement of the vehicle body 3 can be regarded as the superposition of three movements, namely a horizontal linear movement (arrow 60) along the rails 7, 8, a vertical linear movement along the guide rails 20, and a rotary movement, clockwise as seen in FIG. 1, about the axis of the rotary pegs 24. During this the vehicle body 3 is "wound" over the end wall of the immersion bath 2 on the entry side. The corresponding position is illustrated in perspective in FIG. 3.

Figure 4:
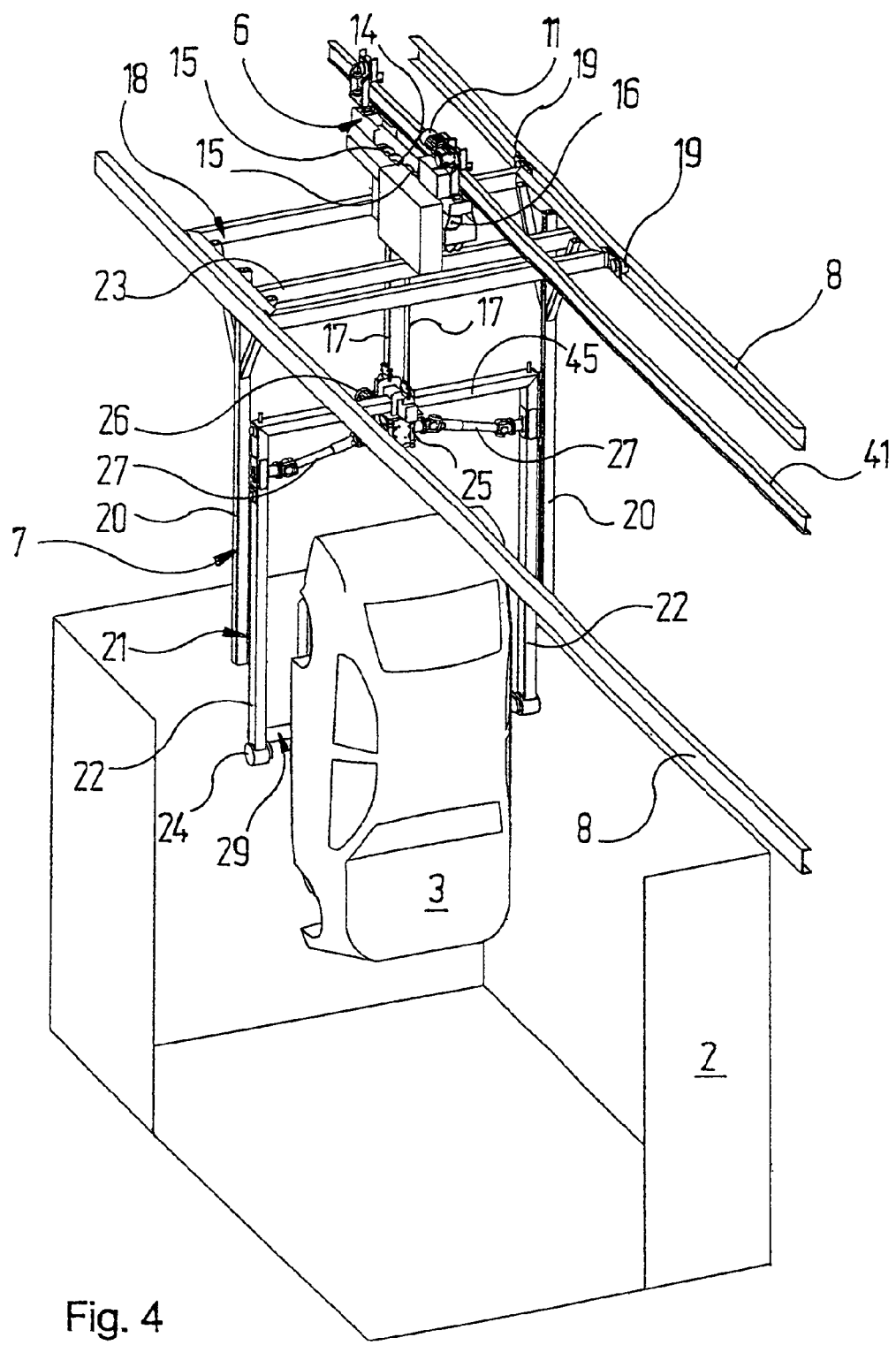

As the slide 21 continues to be lowered and the vehicle body 3 continues to be rotated about the axis of the rotary pegs 24, a position is finally reached in which the vehicle body 3 is substantially vertical, as illustrated in FIG. 4. Here, the vehicle body 3 is still relatively close to the end wall of the immersion bath 2 on the entry side. As the transport carriage 5 continues to move and hence the spacing between the centre of the vehicle body 3 and the end wall of the immersion bath 2 on the entry side grows, the rotary pegs 24 and hence the vehicle body 3 are turned further clockwise, such that the vehicle body 3 begins to lie on its back. The speed of movement in the horizontal direction and the speed of rotation can in this case be matched to one another such that the front end of the vehicle body 3 maintains approximately the same spacing from the end wall of the immersion bath 2 on the entry side during this immersion movement.

Figure 5:
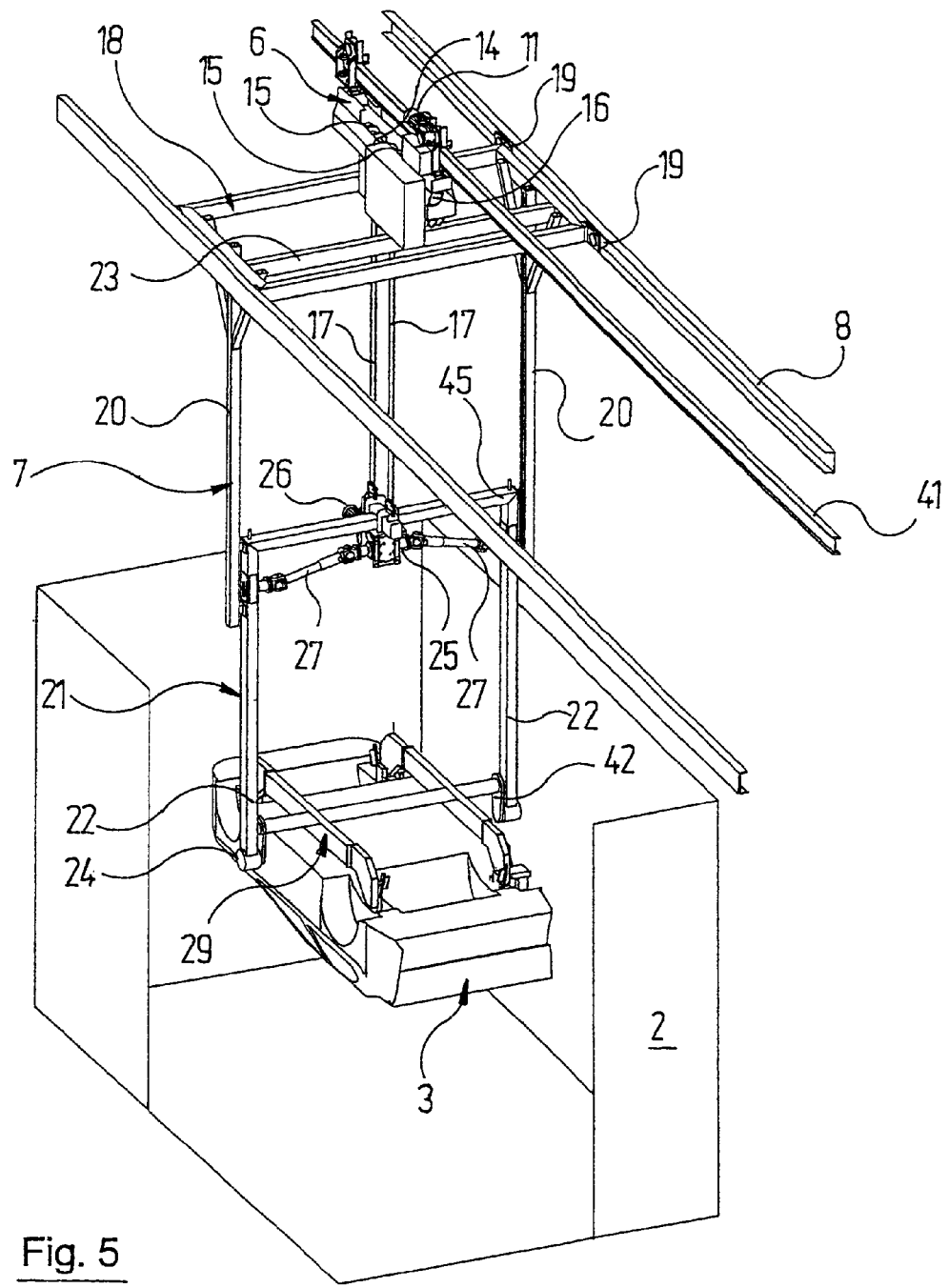
Figure 6:
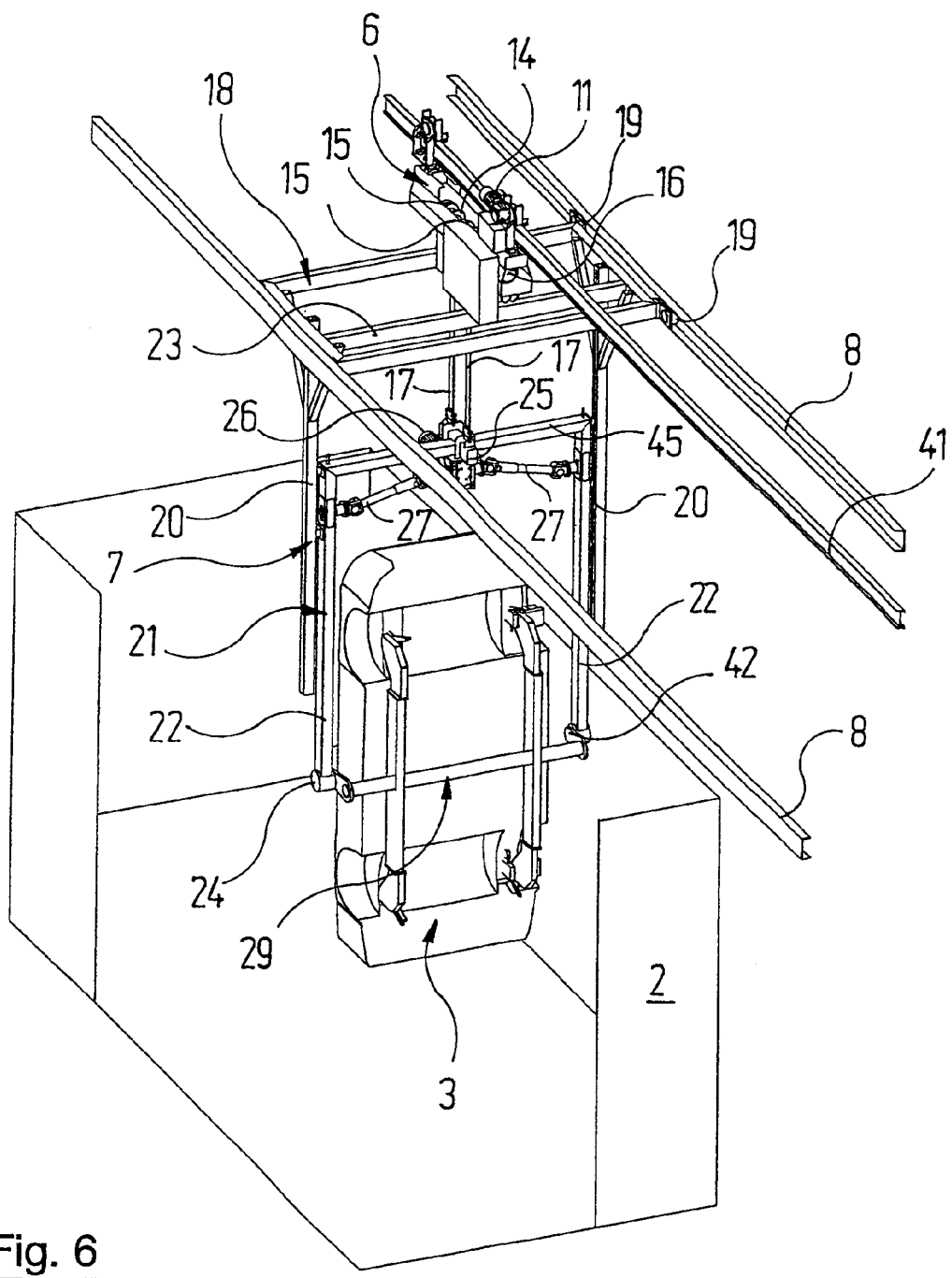
Figure 7:
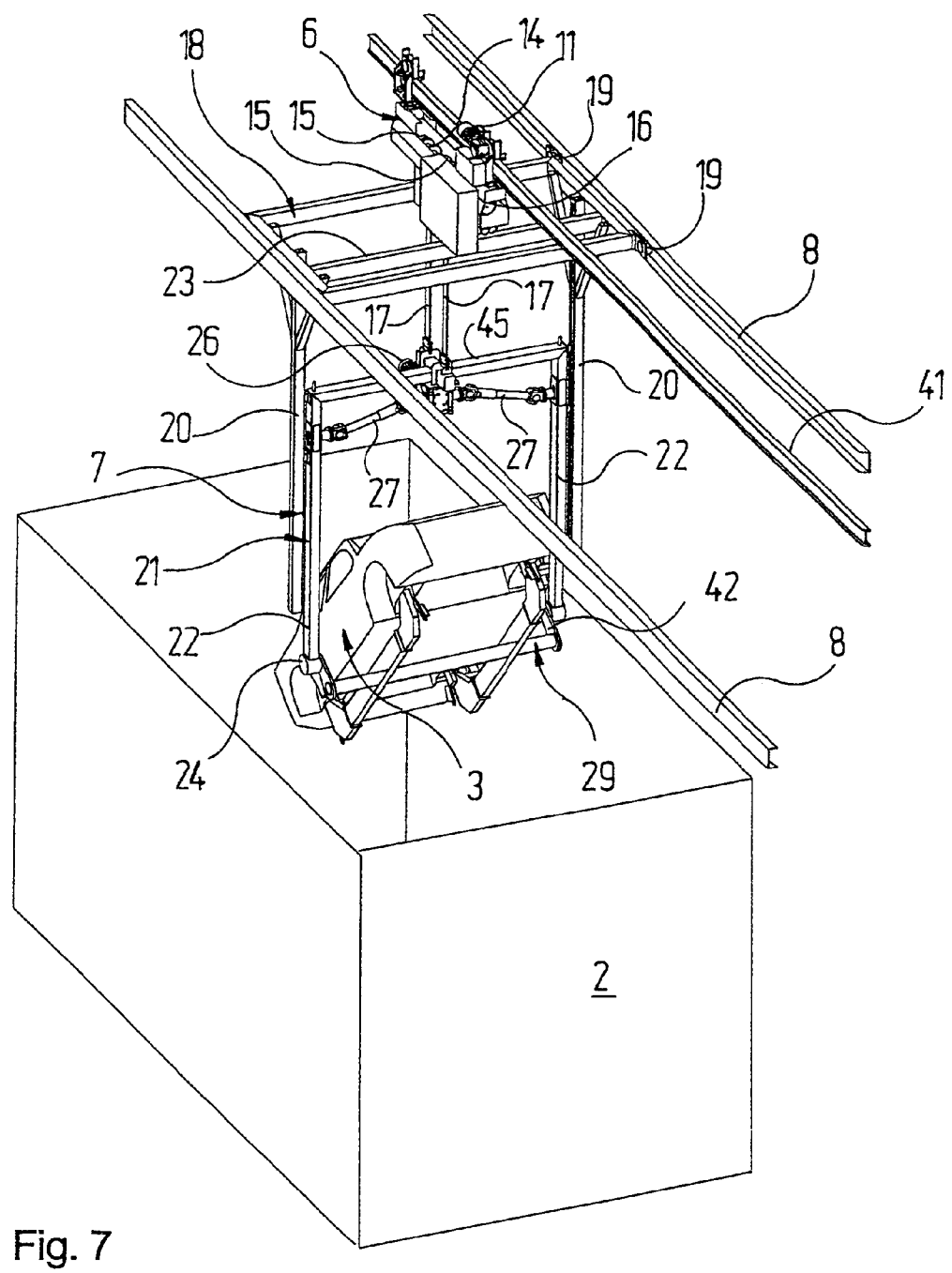
Figure 8:
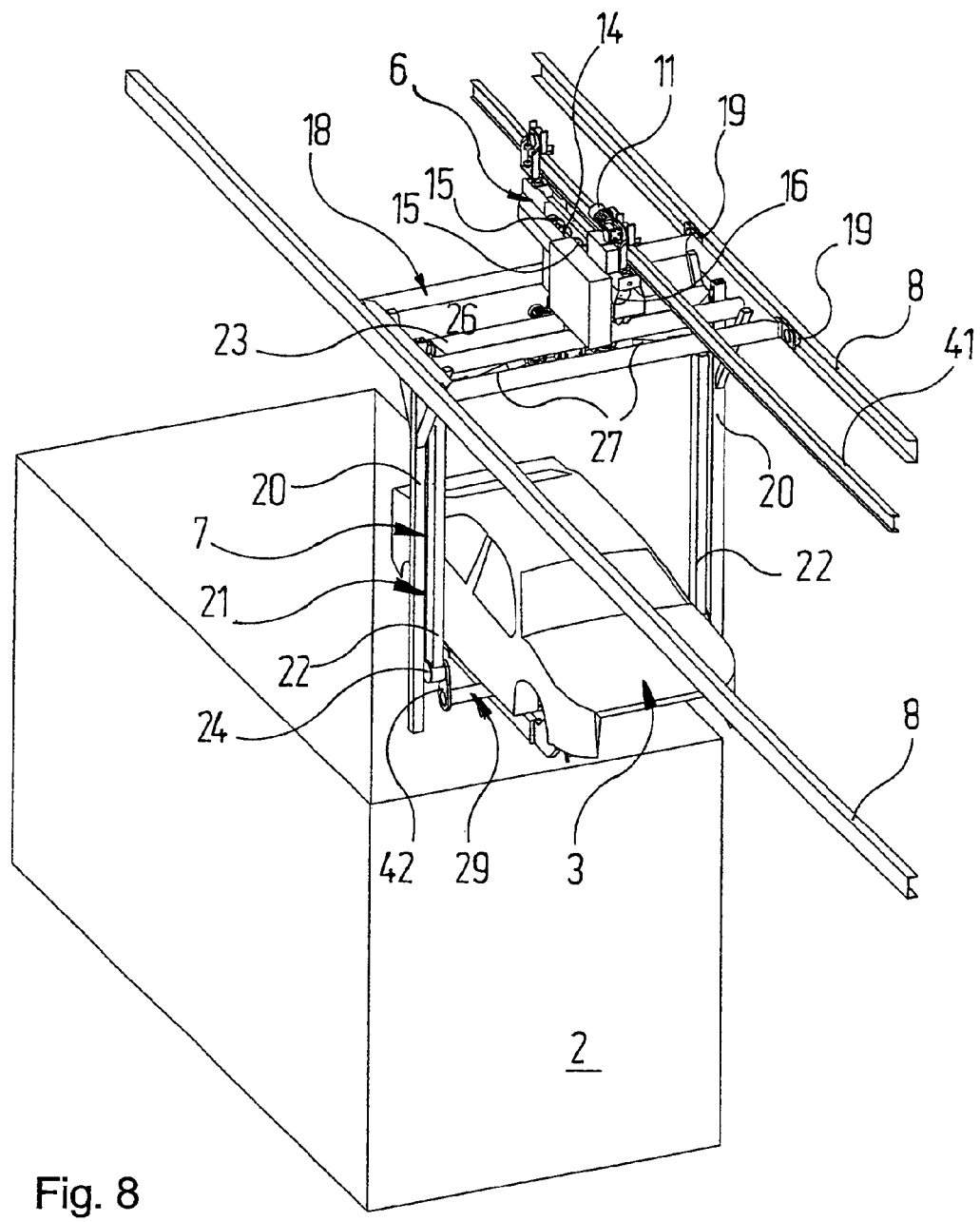

At the latest at the point at which the vehicle body 3 is completely on its "back" and hence lies horizontal again, as illustrated in FIG. 5, the vehicle body 3 is completely immersed in the liquid paint. The vehicle body 3 is conveyed further through the immersion bath 2, at first in this position, with the aid of the transport carriage 5 until it has come closer to the end wall of the immersion bath 2 on the exit side. Then, the procedure of emergence of the vehicle body 3 from the bath begins. This procedure can once again be regarded as the superposition of three movements, namely the horizontal linear movement in the direction of conveying 60, the vertical movement along the guide rails 20 and the rotary movement about the axis of the rotary pegs 24. First the vehicle body 3, as illustrated in FIG. 6, is set vertical by the rotary pegs 24 continuing to turn clockwise. Then the vehicle body 3 is "wound" by pulling up the slide 21 and continuing the rotary movement up over the end wall of the immersion bath 2 on the exit side (cf. FIG. 7), until a horizontal position of the freshly painted vehicle body 3 is reached again in the direction of conveying 60 downstream of the immersion bath 2, as illustrated in FIG. 8.

Figure 9:
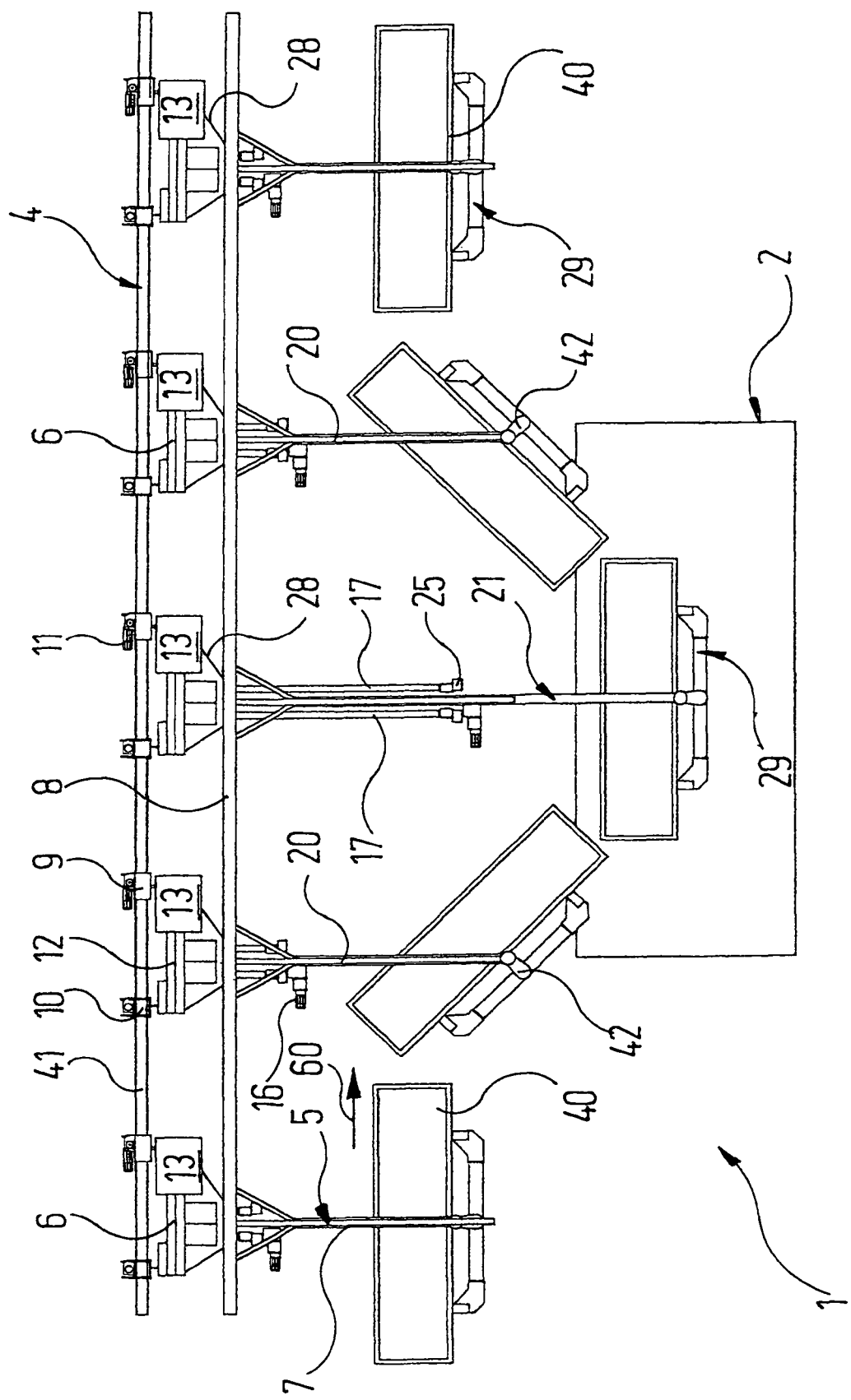
FIG. 9 shows the cataphoretic immersion coating system from FIG. 1, but equipped with holding baskets for small articles to be coated.
Figure 10:
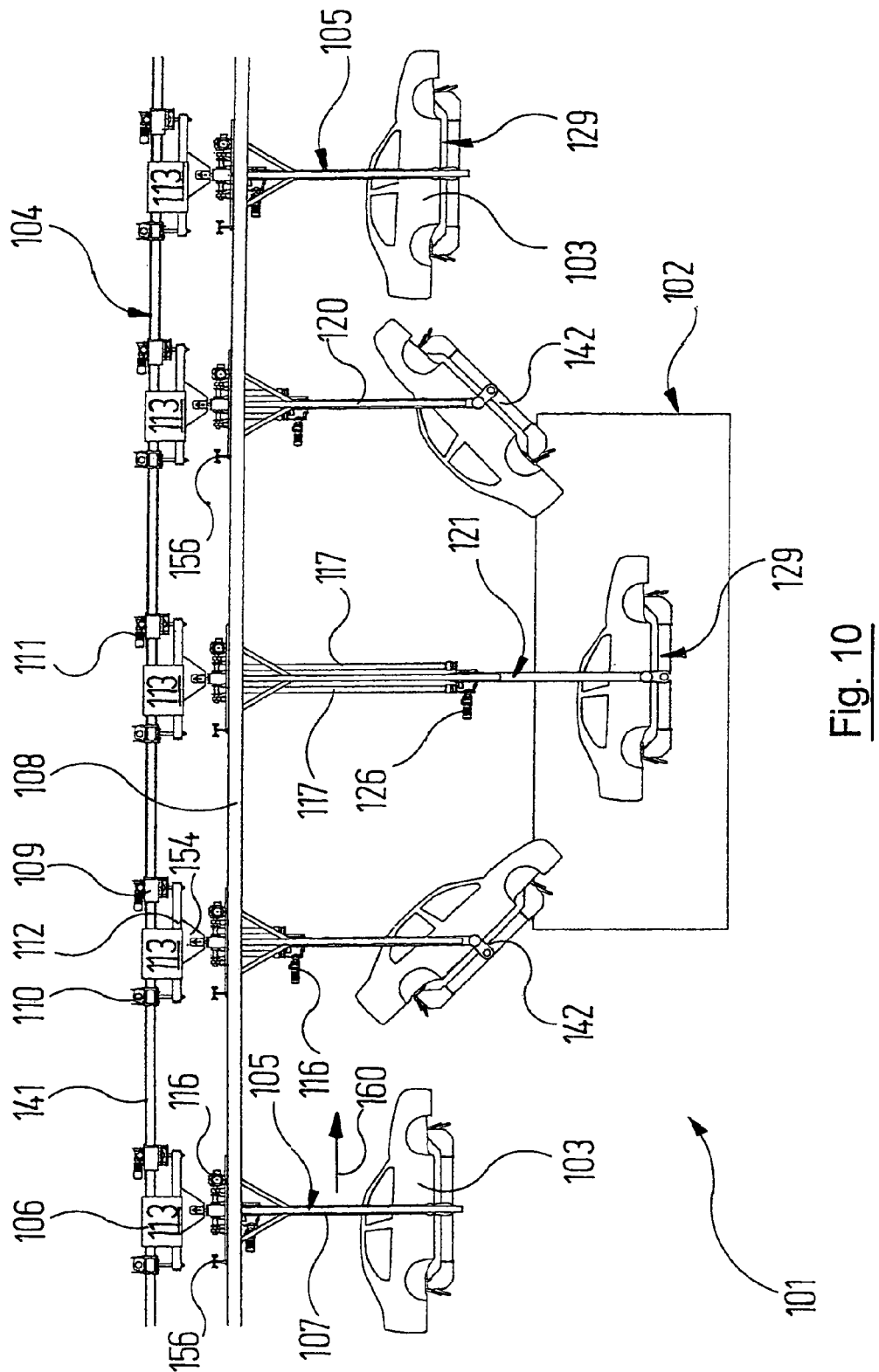
FIG. 10 shows, in a side view similar to FIG. 1, a second exemplary embodiment of a cataphoretic immersion coating system for vehicle bodies.
Figure 11:
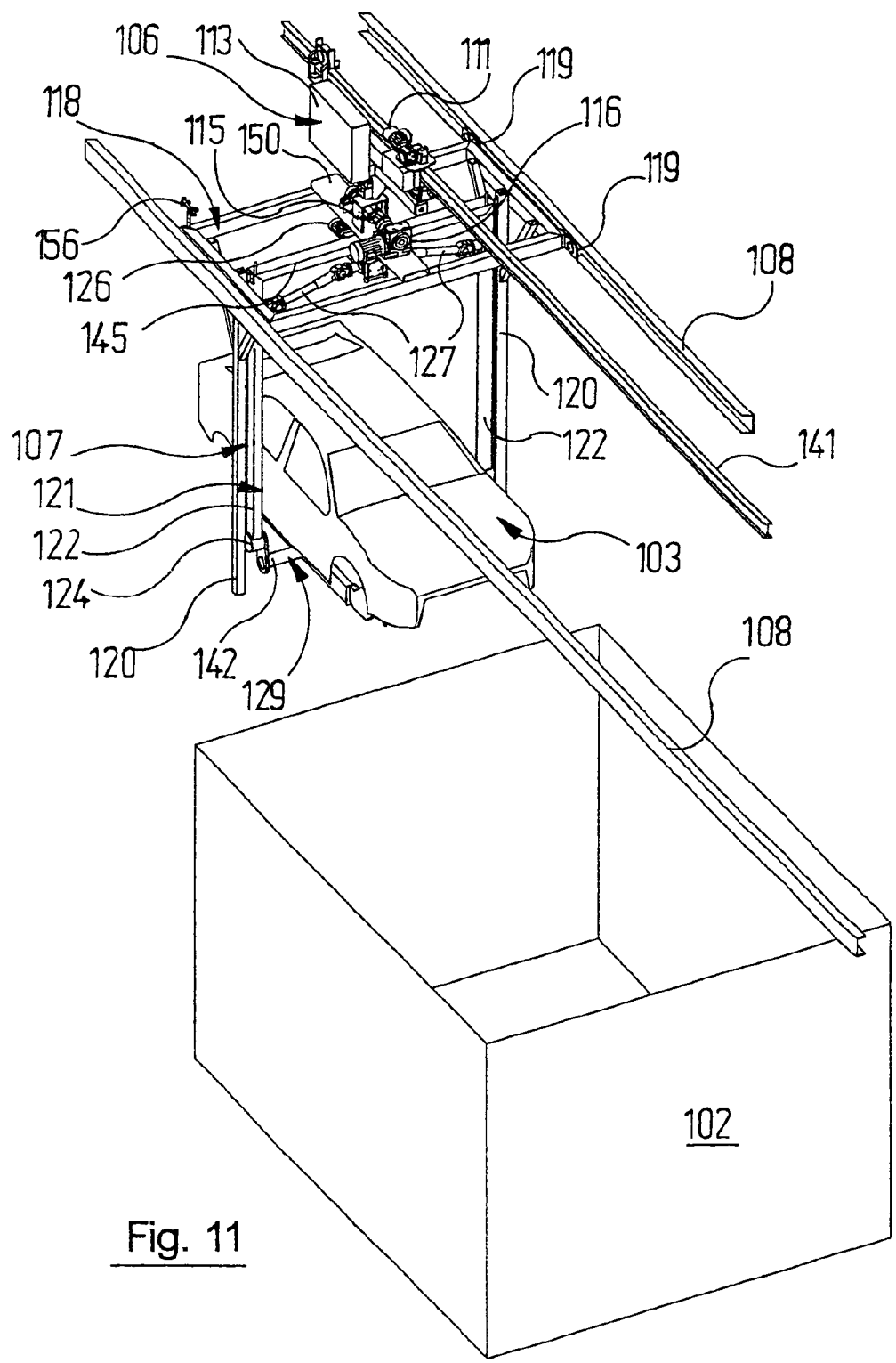
FIGS. 11 to 17 show phases in the immersion of a vehicle body in the immersion bath of the cataphoretic immersion coating system from FIG. 10, from different perspectives.
Figure 12:
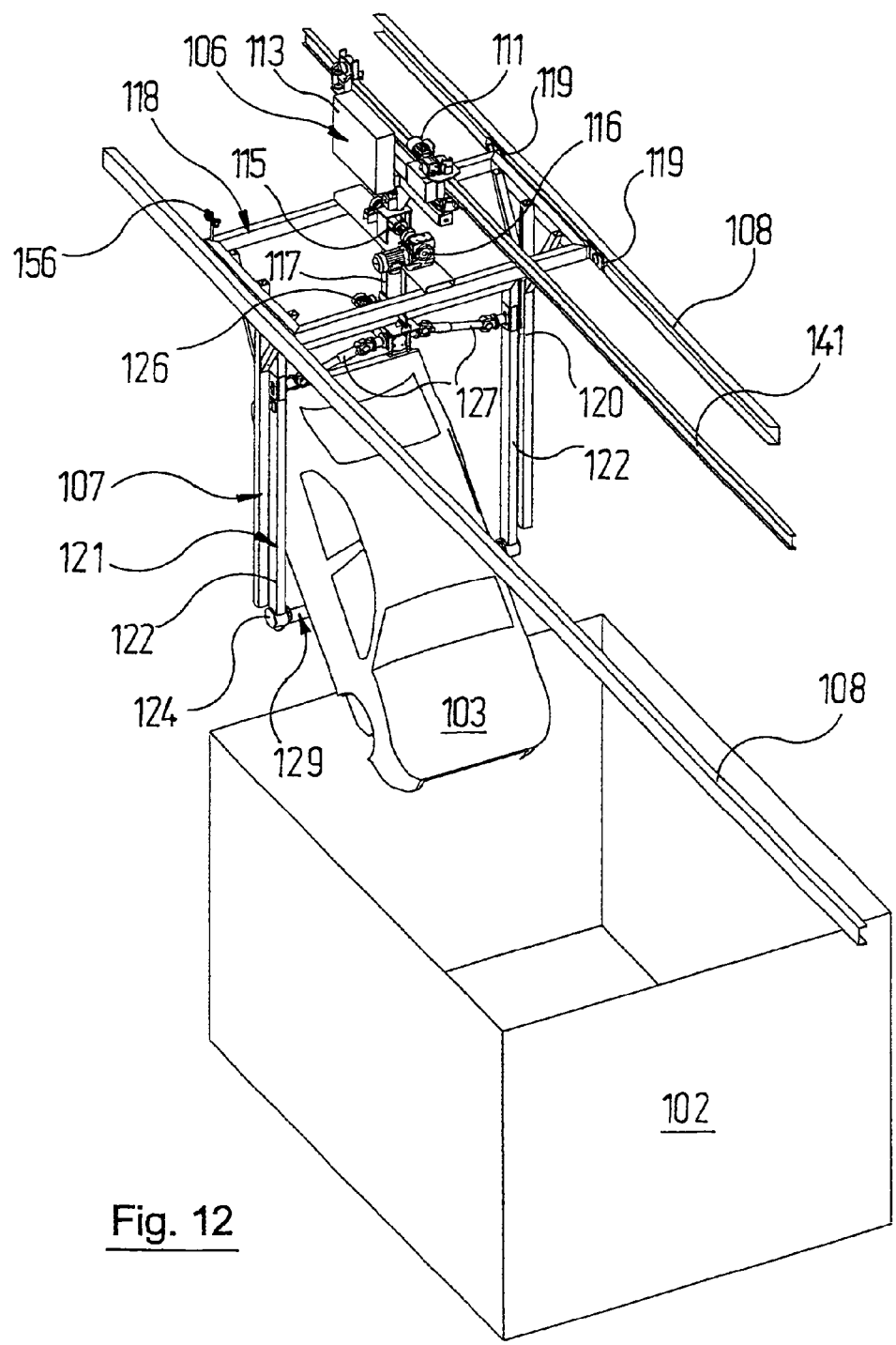
Figure 13:
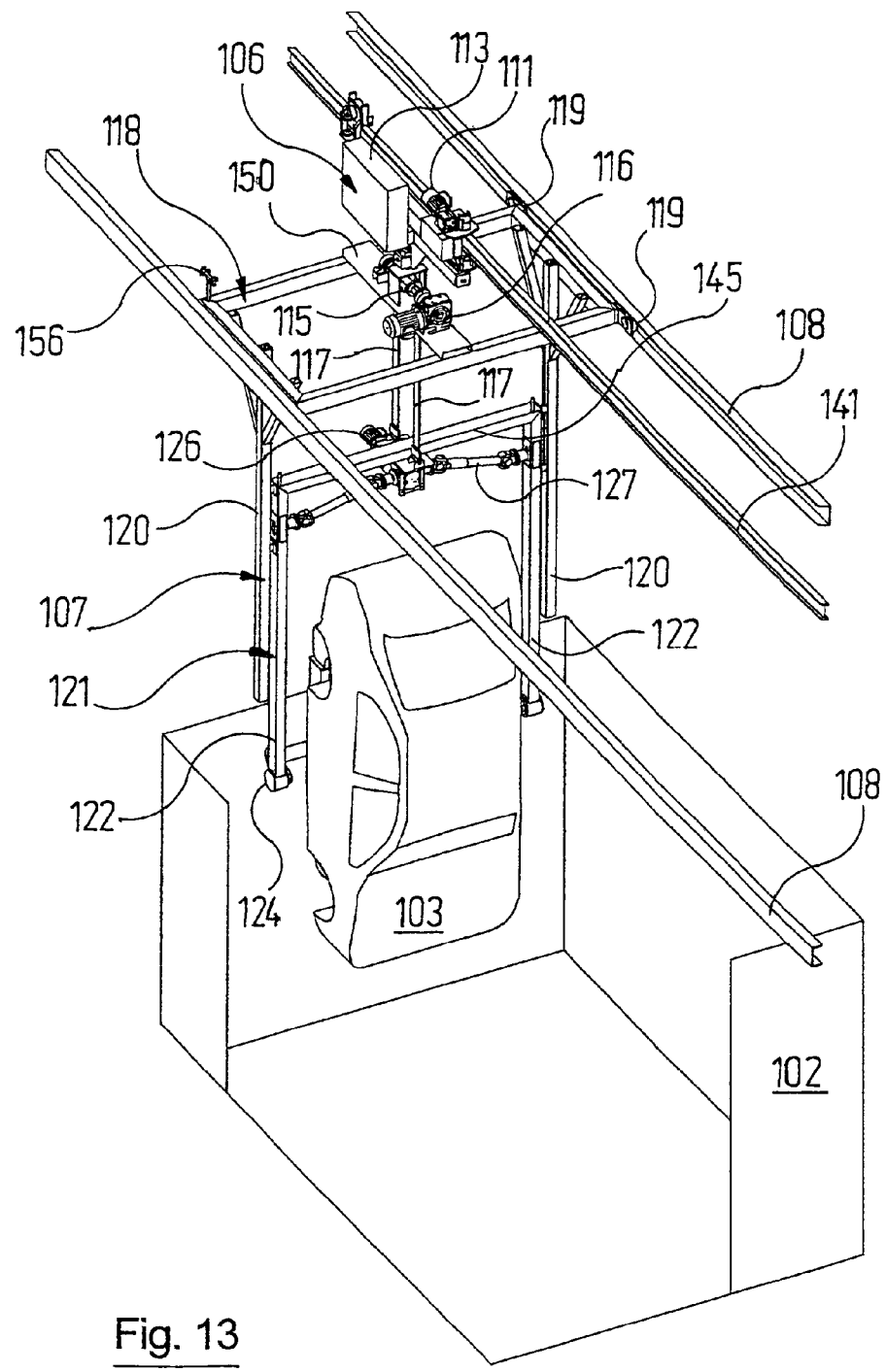
Figure 14:
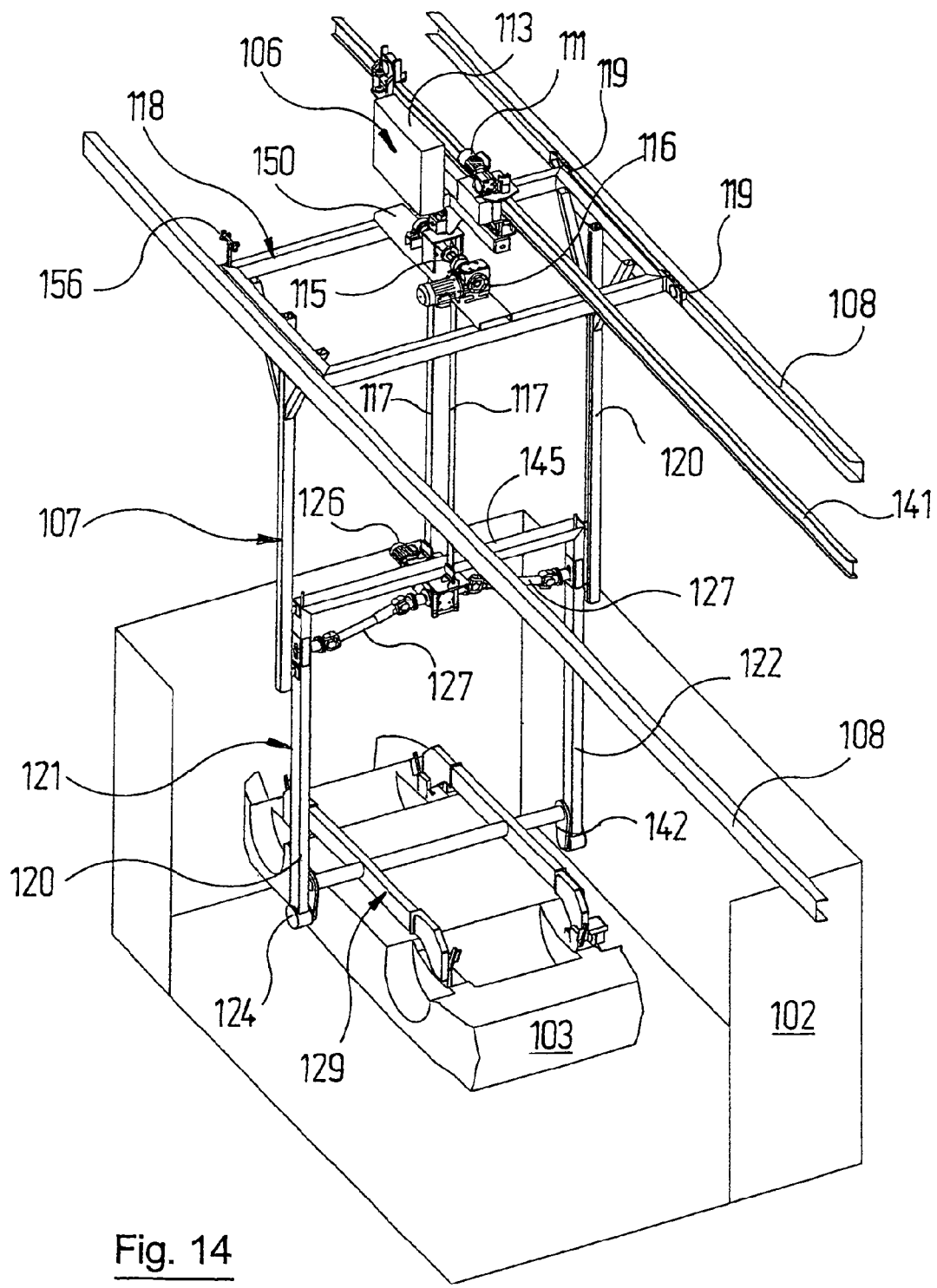
Figure 15:
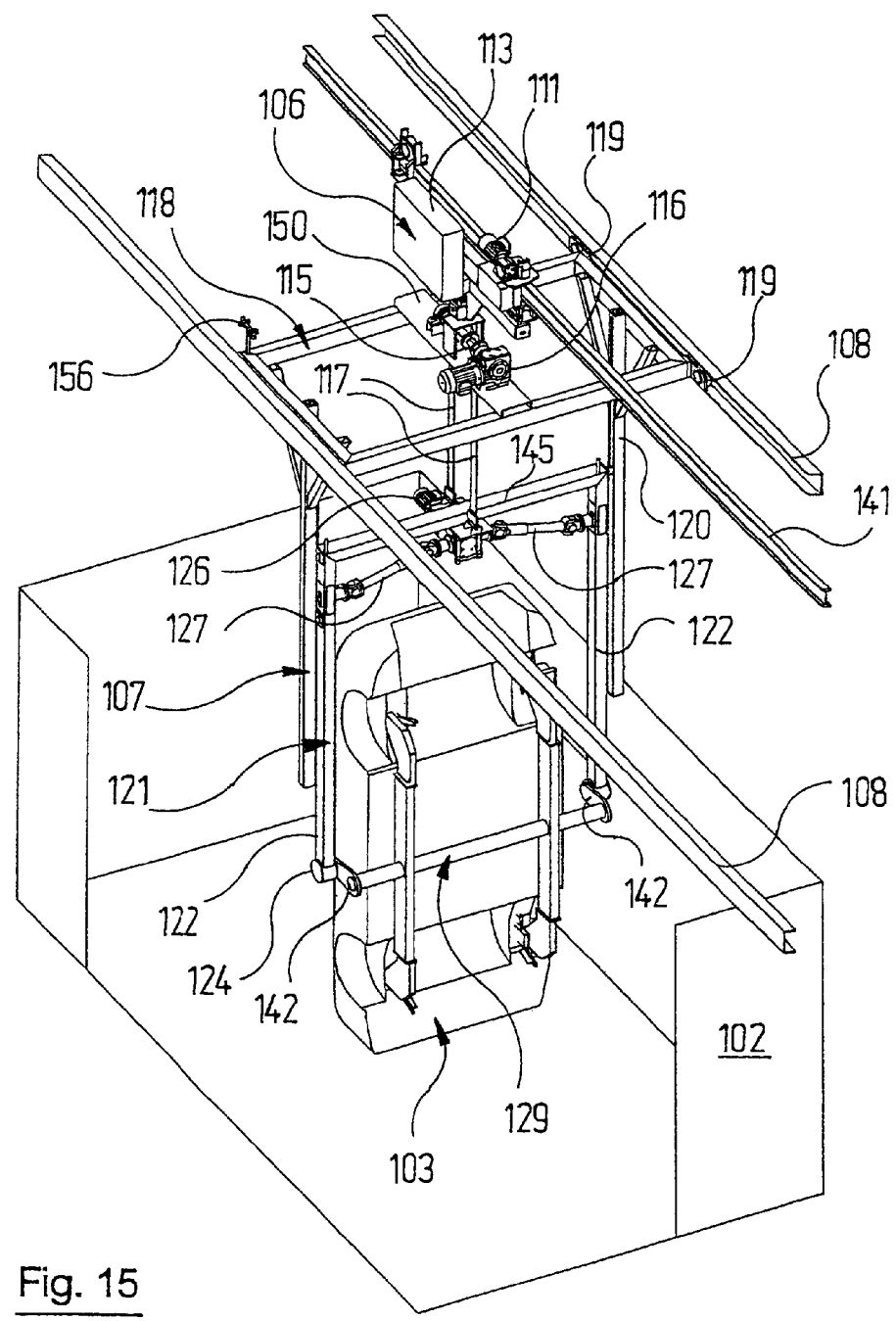
Figure 16:
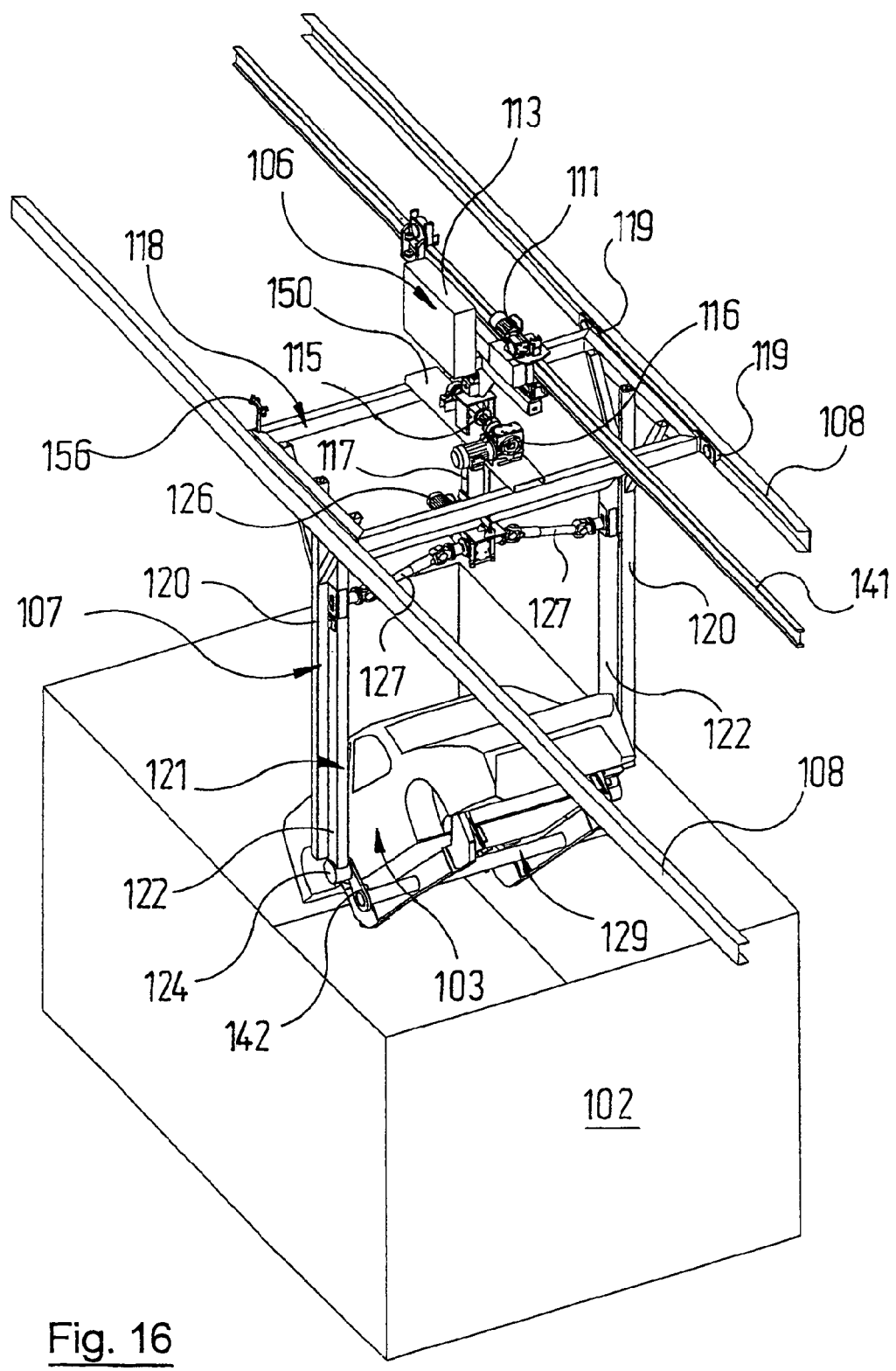
Figure 17:
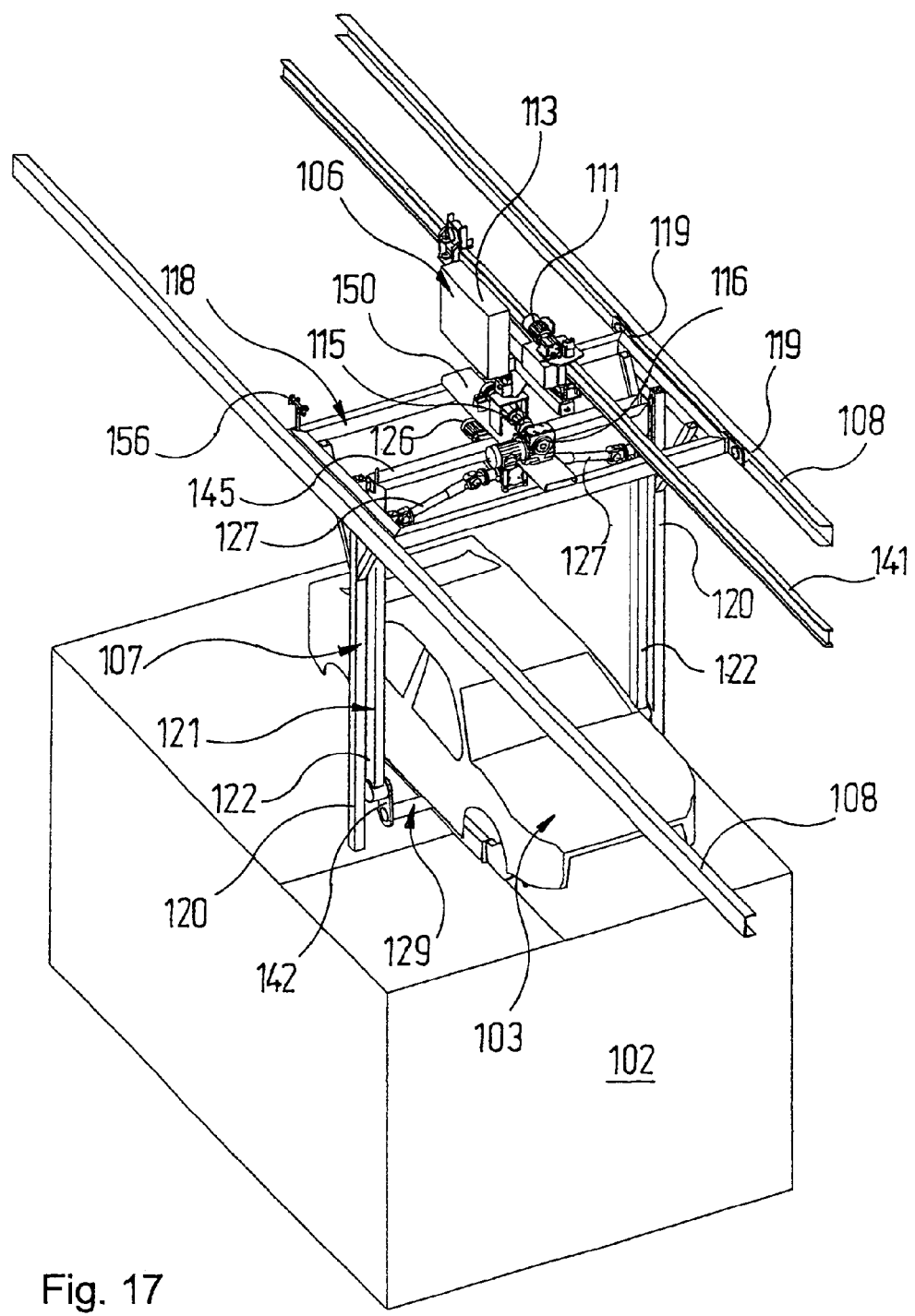

The sequence of movements of the vehicle body 3 that has been described as it passes through the immersion bath 2 is only one example. The structural embodiment of the transport carriage 5 allows a number of other kinematic arrangements which can in each case be adapted to the type of vehicle body 3. The immersion coating system 1 described may also be used to immersion coat relatively small objects (small articles), as shown schematically in FIG. 9. Instead of the vehicle bodies 3, in this case holding baskets 40 containing the objects to be coated, which are small parts (not illustrated), loosely piled together for example, are fastened to the securing device 29 of the transport carriages 5. These holding baskets 40, which allow penetration of the liquid paint, are guided through the liquid paint in the immersion bath 2 in similar manner to that described above for the vehicle bodies 3. However, the holding baskets 40 are not laid on their "back". They reach their central position in FIG. 9, in the immersion bath 2, where they are once again aligned horizontally by an anticlockwise rotary movement, such that the upper side of the holding baskets 40 continues to point upwards after immersion in the paint. In this way, it is possible to leave the upper side of the holding baskets 40 open without the possibility of the contents of the holding baskets 40 falling out. This is advantageous when the holding baskets 40 are loaded and emptied.

In FIGS. 10 to 19, a second exemplary embodiment of a cataphoretic immersion coating system is illustrated, which is very similar to the exemplary embodiment described above with reference to FIGS. 1 to 9. Like parts are thus given the same references numeral plus 100. The description below is limited to the differences between the two exemplary embodiments.

The exemplary embodiment according to FIGS. 10 to 19 is characterised in particular by the fact that the holding carriage 107 of each transport carriage 105 may be turned about a vertical axis in relation to the associated drive carriage 106. The point of this structural feature will become clear below. This additional degree of rotational freedom, which does not exist in the exemplary embodiment of FIGS. 1 to 9, is made possible by the following structural features, which are particularly readily visible in FIG. 18:

A longitudinal crosspiece 150 is secured to the two long sides, in the centre between the short sides of the guide frame 119. The shaft 114 which was secured to the connection structure 12 of the drive carriage 6 in the exemplary embodiment of FIG. 1 is mounted on this longitudinal crosspiece 150. The winding motor 116 is also arranged on the upper side of the longitudinal crosspiece 150. Also secured to the upper side of the longitudinal crosspiece 150 is an entraining structure 151 which resembles a gantry and bridges the shaft 114, and to the upper side whereof the lower end of a rotary peg 152 is secured, not itself readily visible in the figures. The rotary peg 152 is for its part mounted in a bearing 153 which is secured in a recess in an approximately triangular entraining plate 154 on the underside of the connection structure 112 of the drive carriage 106. Not visible in the drawing is a drive motor with the aid of which the rotary peg 152 can be turned about its axis.

Secured at one corner of the guide frame 118 is an upwardly projecting guide member 155 which is particularly visible in FIGS. 10 to 17 and 19 and whereof the function will become clear below.

Operation of the second exemplary embodiment of the immersion coating system 101 is as follows:

The vehicle bodies 103 pass through the immersion bath 102 illustrated in FIGS. 10 to 17 in the same way as that described above with reference to FIGS. 1 to 8 for the first exemplary embodiment. The rotary peg 152, which connects the drive carriage 106 to the holding carriage 107, is in this case preferably locked in the bearing 153; the alignment of the guide frame 118 is such that its short sides are adjacent to the guide rails 108, and the guide rollers 119 engage in the guide rails 118.

Figure 18:
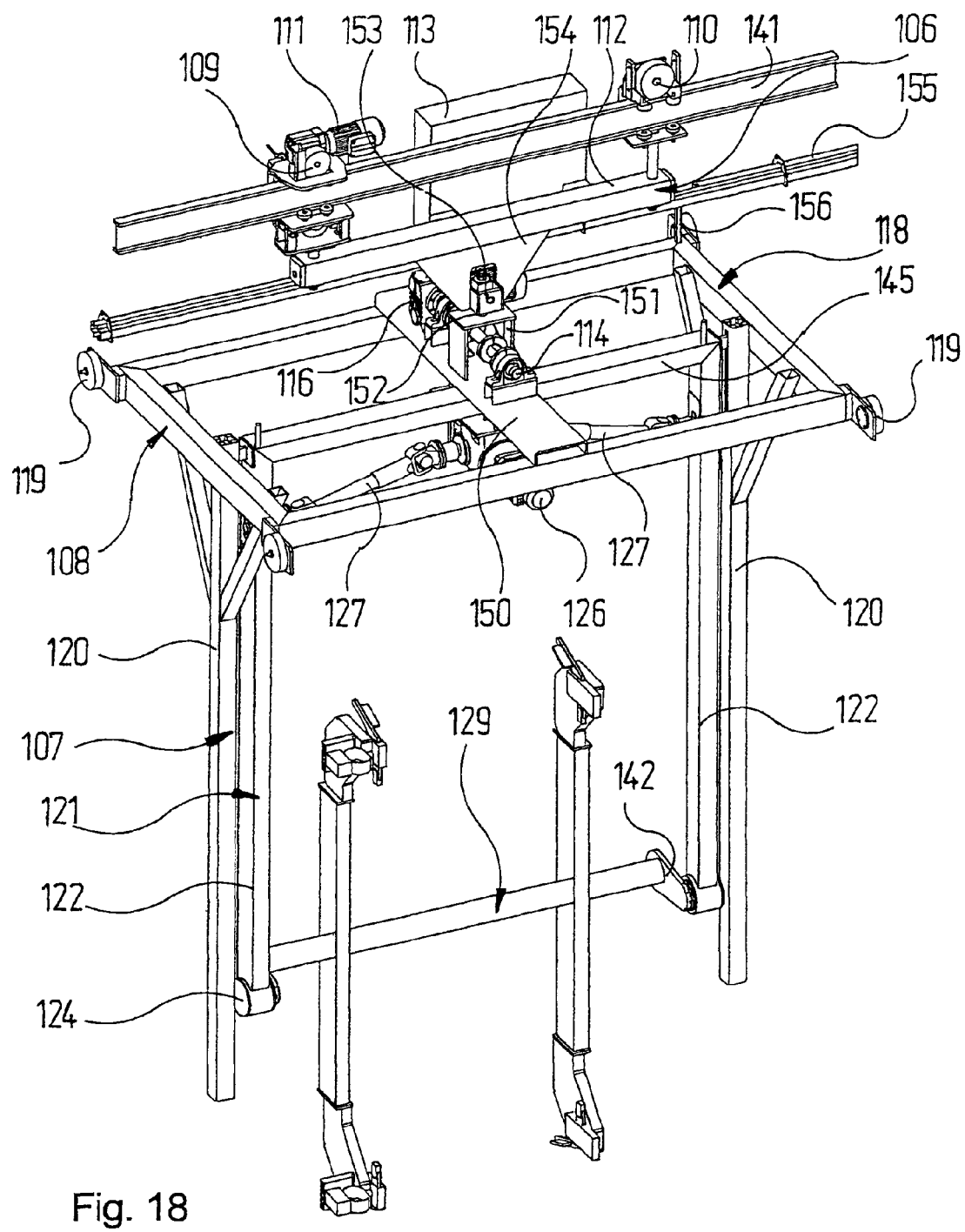
FIG. 18 shows in perspective a transport carriage as used to convey the objects to be coated in the immersion coating system from FIGS. 10 to 17 during the return procedure from the exit of the system to its entry.

The additional degree of rotational freedom of the transport carriages 105 in the second exemplary embodiment only becomes relevant once the vehicle bodies 103 have left the immersion bath and are removed from the transport carriages 105 for further processing. The transport carriages 205 then have to be guided back to the entry of the immersion coating system 101 so that they can be laden again there with vehicle bodies 103 which have yet to be coated. For this purpose, the guide frames 118 of the transport carriages 105 leave the guide rails 108, which can simply end at an appropriate point. The holding carriage 107 can then be turned by motor through 90° in relation to the transport carriage 105, about the vertical axis of the rotary peg 152, such that the longitudinal sides of the rectangular guide frame 118 are now parallel to the direction of movement, as illustrated in FIG. 18. The guide member 155 on the upper side of the guide frame 119 now comes into engagement with an (individual) guide rail 156 which extends parallel to the continuing drive rail 107, along the return path of the transport carriages 105. As a result of the mutual engagement of the guide member 155 and the guide rail 156, undesired and uncontrolled movements of the holding carriage 107 in relation to the drive carriage 106 are suppressed.

By rotating the holding carriage 107 in relation to the drive carriage 106, the space required for the transport carriage 105 on the return path from the exit of the immersion coating system 101 to the entry thereof is reduced. This space saving is that much greater the shorter the short sides of the rectangular guide frame 119.

Figure 19:
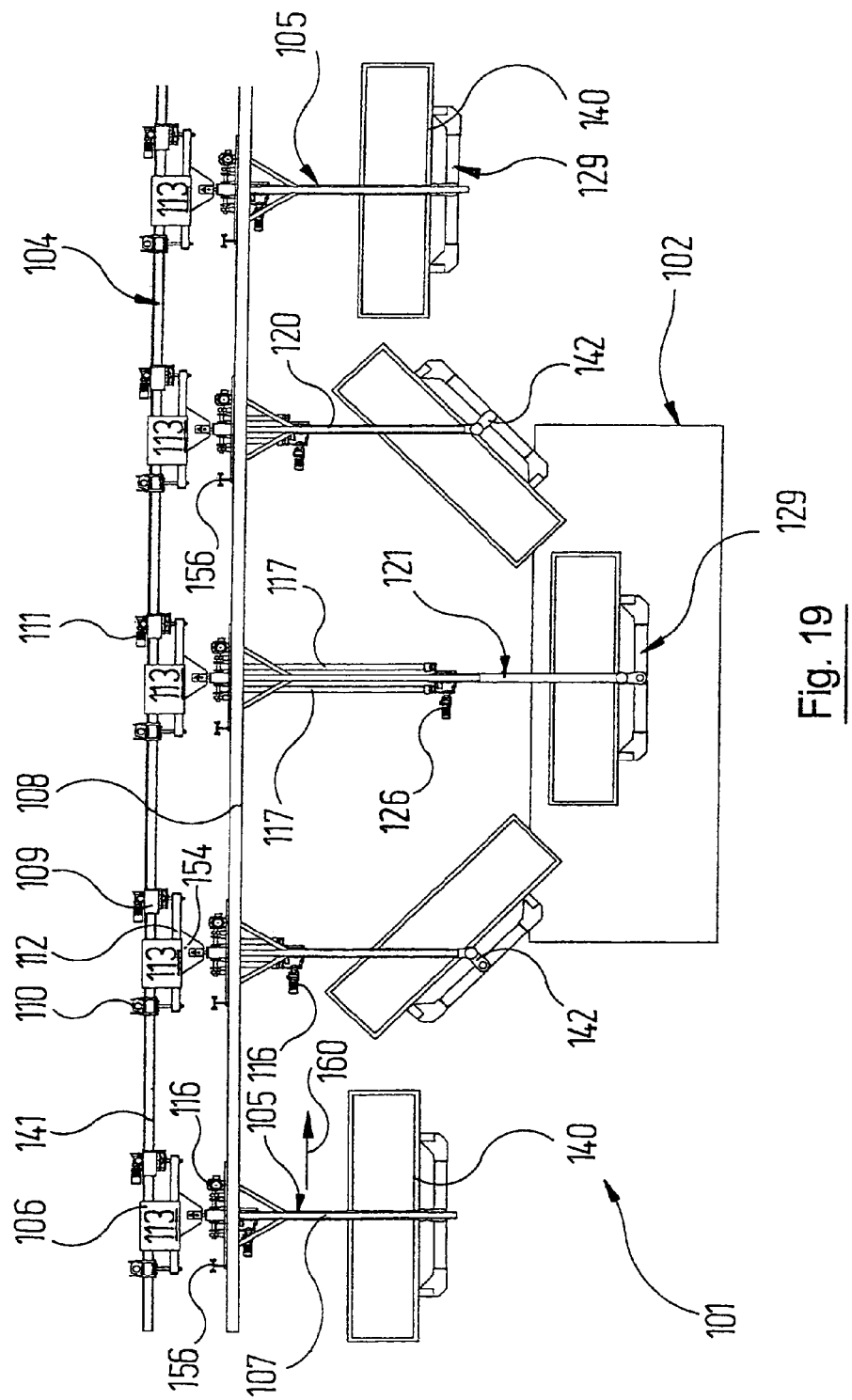
FIG. 19 shows the immersion coating system from FIGS. 10 to 18, but equipped with holding baskets for small articles to be coated.

It goes without saying that the second embodiment of an immersion coating system 101 may also be provided with holding baskets 140 for small objects to be coated instead of with vehicle bodies 103, as shown schematically in FIG. 19.

In both the exemplary embodiments described above, substantially conventional drive carriages of electric overhead conveyors were used as drive carriages 6; 106 for the translational drive (linear movement in the horizontal direction according to the arrow 60 in FIG. 1). These have the advantage of particularly broad variability in operation, that they can be moved, stopped and where appropriate also reversed in their direction of movement independently of one another, with the required control means already being developed and tried and tested. It goes without saying that other drive devices can also be used for the holding carriages 7; 107, however, and in principle any conveying means below which the holding carriages 7; 107 can be suspended is possible.

Figure 20:
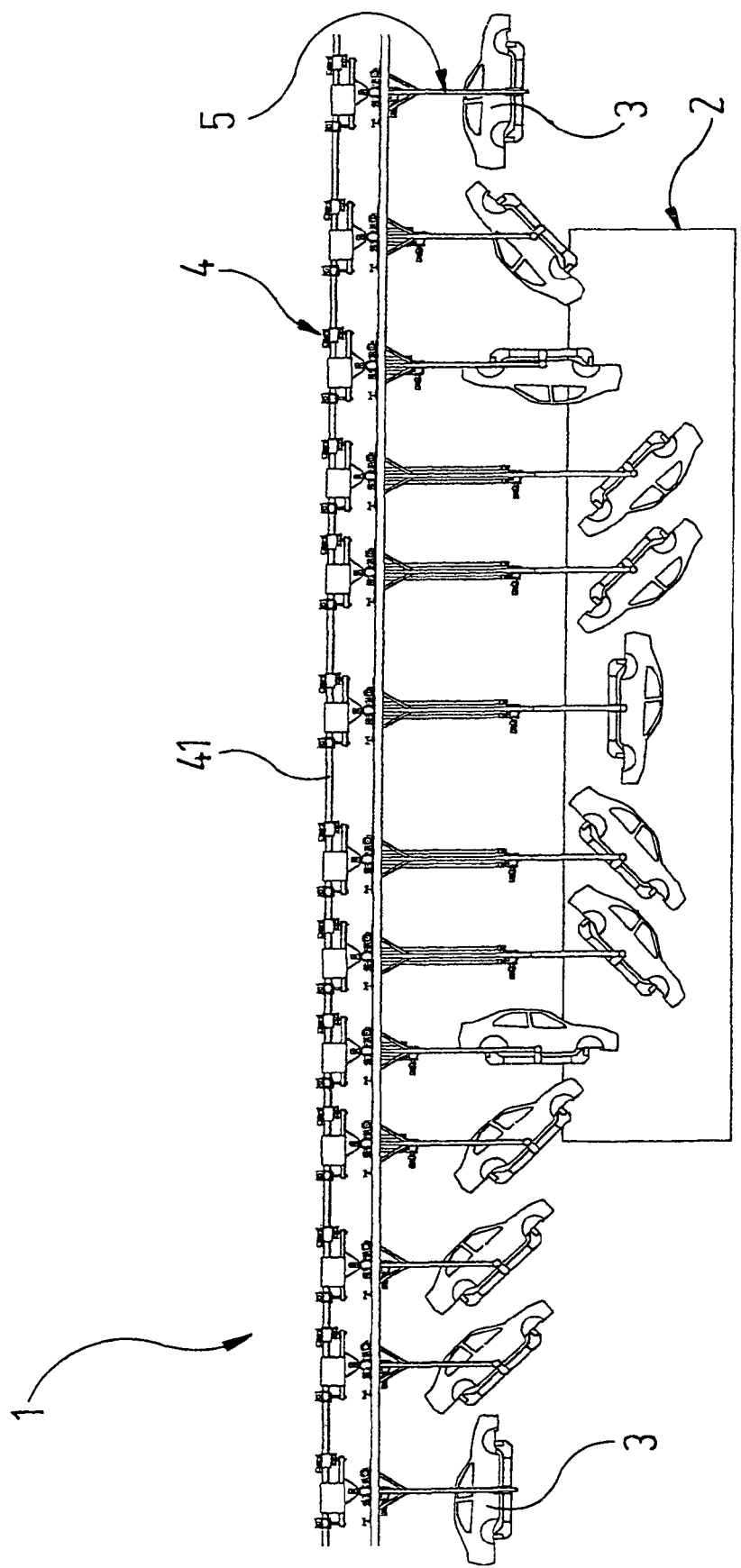

The ways in which the vehicle bodies 3; 103 are guided through the immersion bath 2; 102, described above with reference to FIGS. 1 to 19, are merely one example of many different kinematic arrangements which can be produced using the immersion coating system 1; 101. Another example is shown schematically in FIG. 20. In this case, the fed vehicle bodies 3 are positioned obliquely, at an angle of approximately 45° in relation to the horizontal, while they are still at a certain distance from the immersion bath 2. The "winding" of the vehicle body 3 over the end wall of the immersion bath 2 on the entry side then takes place from this oblique position, similarly to FIG. 1. However, before the vehicle bodies 3 reach the horizontal position on their backs, they are moved for a certain distance at an angle of approximately 45° in relation to the horizontal again, and again after they have passed through the horizontal position on their backs before they emerge from the bath. The point of this oblique position is to shorten the system in the direction of conveying.

FIGS. 21 to 38 illustrate a third exemplary embodiment of a cataphoretic immersion coating system 200. The latter includes an immersion bath 202 filled with liquid paint. In accordance with the exemplary embodiments of FIGS. 1 to 19, particles of paint migrate within an electrical field located between vehicle bodies 204 and anodes which are arranged along the path of movement of the vehicle bodies 204 and are not illustrated for reasons of clarity, towards the vehicle bodies 204 and are deposited thereon.

The vehicle bodies 204 are guided through the system, and in particular through the immersion bath 202 and the paint therein, with the aid of a conveyor system 206. The conveyor system 206 includes a plurality of transport carriages 208 which for their part have a drive carriage 210 and a holding carriage 212, which are coupled to one another by way of a telescopic device 214 which will be explained in detail below.

A drive rail 216 having an I-shaped profile, as used in conventional electric overhead conveyors, runs above the immersion bath 202. Below the drive rail 216 and above the immersion bath 202 there extends, parallel to the drive rail 216, a guide rail 218 having an upwardly open U-shaped profile.

Figure 21:
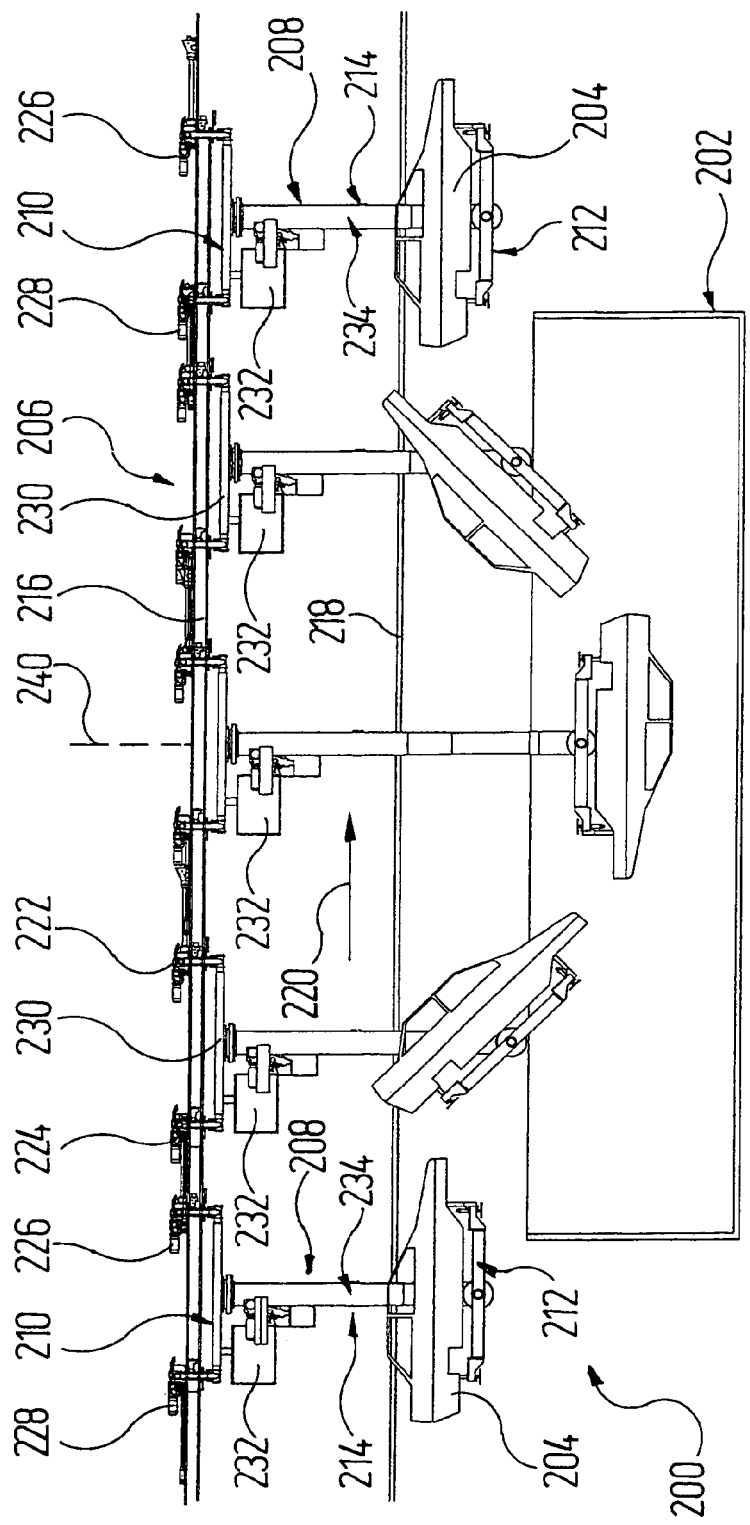
FIG. 21 shows, in a side view similar to FIGS. 1 and 10, a third exemplary embodiment of a cataphoretic immersion coating system for vehicle bodies.

The direction of movement in which the vehicle bodies 204 are conveyed by means of the conveyor system 206 is illustrated by an arrow 220 in FIG. 21. The drive rail 216 and the guide rail 218 are offset outwards, as seen in the direction perpendicular to the direction of movement 220, in relation to the centre of the immersion bath 202, with the guide rail 218 extending further out than the drive rail 216.

The drive carriages 210 are basically of a construction that is known from conventional electric overhead conveyors. Each of these drive carriages 210 has a travelling gear 222 which leads in the direction of movement 220, called the "leader" in the language of the art, and a further travelling gear 224 which follows in the direction of movement 220 and is called the "trailer" in the language of the art. The leader 222 and trailer 224 are equipped in known manner with guide and support rollers, which are not designated by their own reference numeral here and which roll on different surfaces of the I-shaped profile of the drive rail 216. At least one of the rollers of the leader 222 or trailer 224 serves as a drive roller and for this purpose may be rotated by an electric motor 226 or 228. Where appropriate, it may be sufficient if only the leader 222 is driven. The transport carriage 208, which is driven by way of the drive carriage 210, may where appropriate also pass over inclines if the drive rail 216 has to extend at an angle in certain regions to adapt the path of conveying to local conditions.

Figure 22:
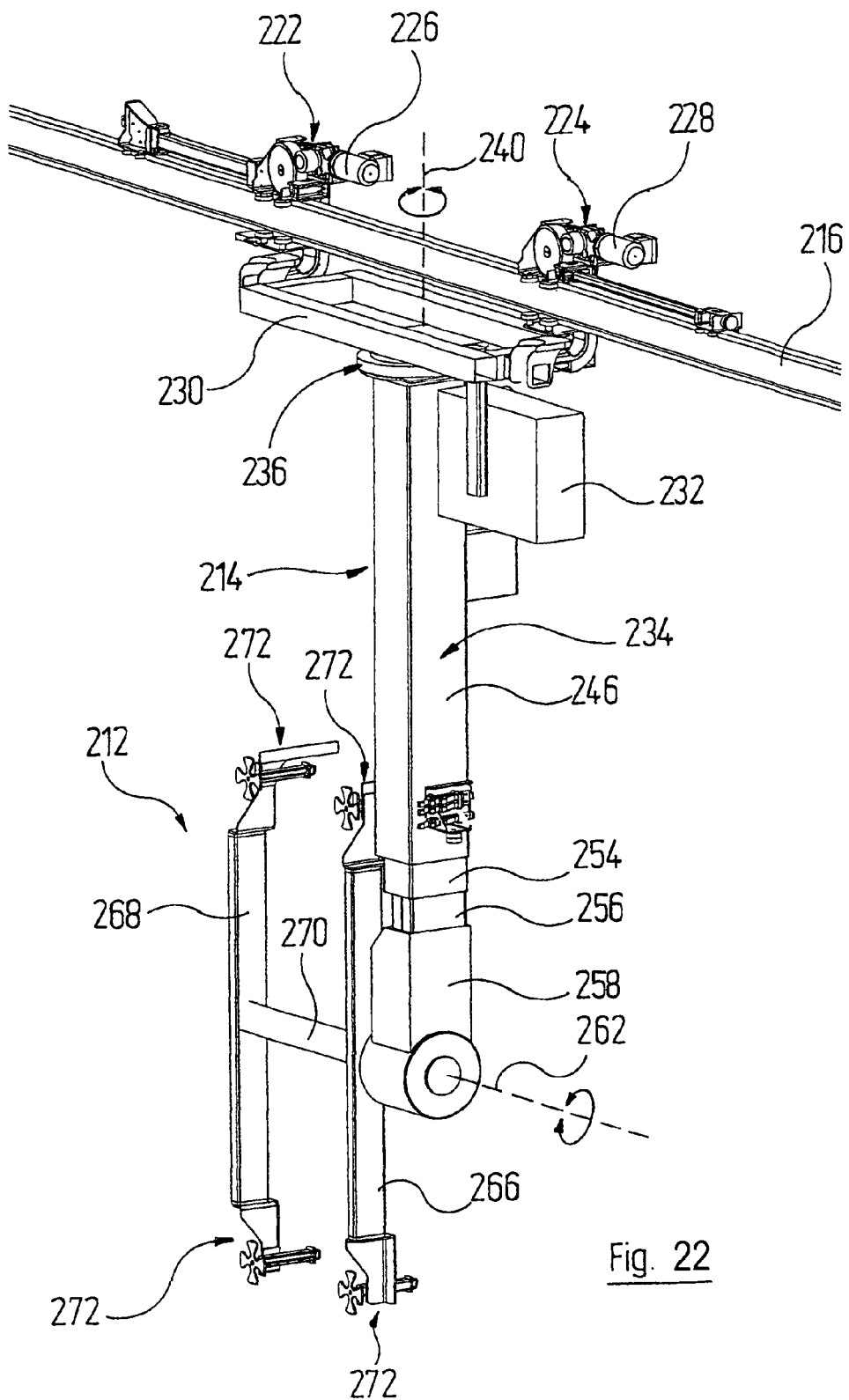
FIGS. 22 and 23 show, in perspective from different directions of view, a transport carriage having a telescopic arm as used to convey the vehicle bodies to be coated in the immersion coating system from FIG. 21, during the return procedure from the exit of the system to its entry.
Figure 23:
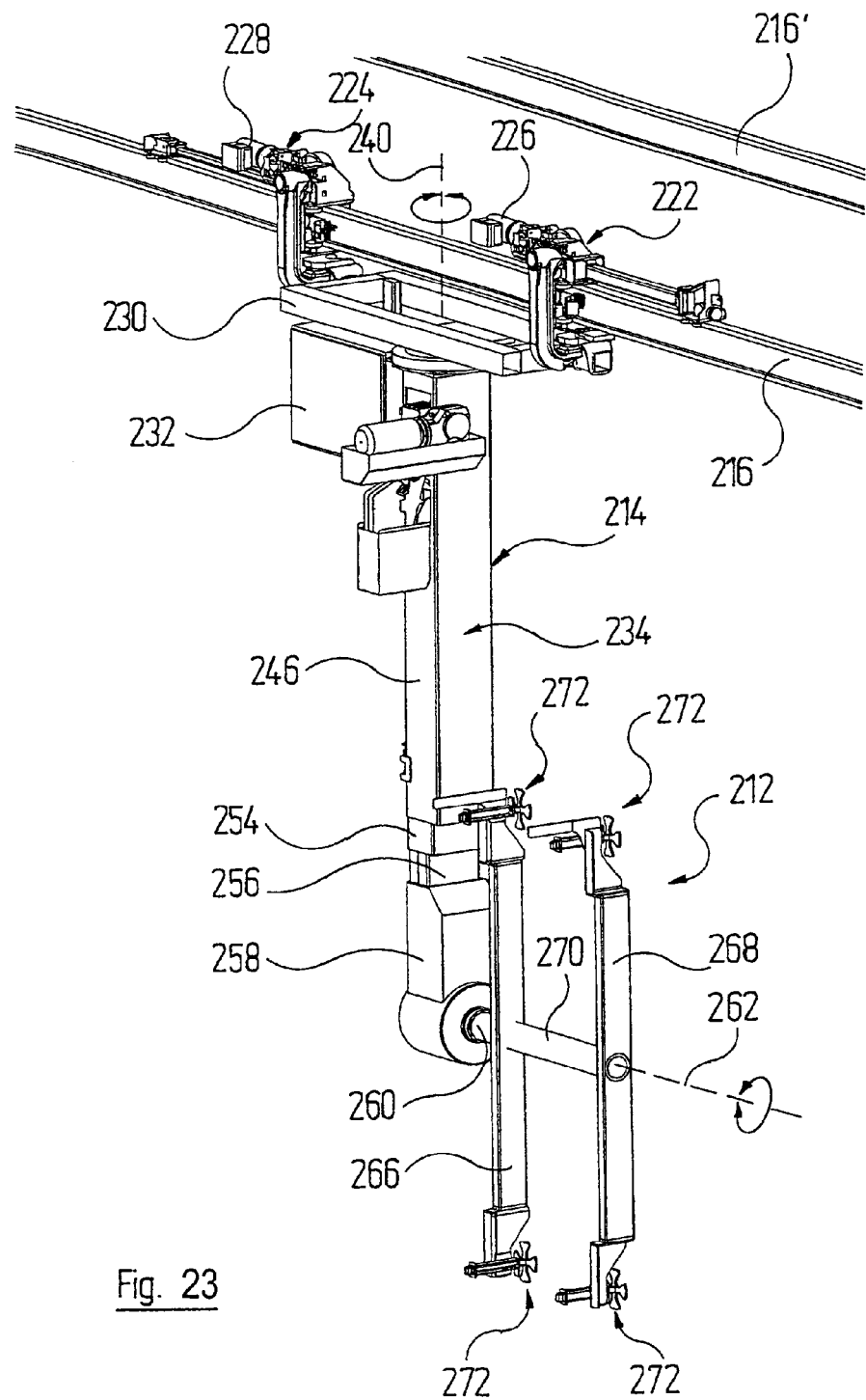
Figure 24:
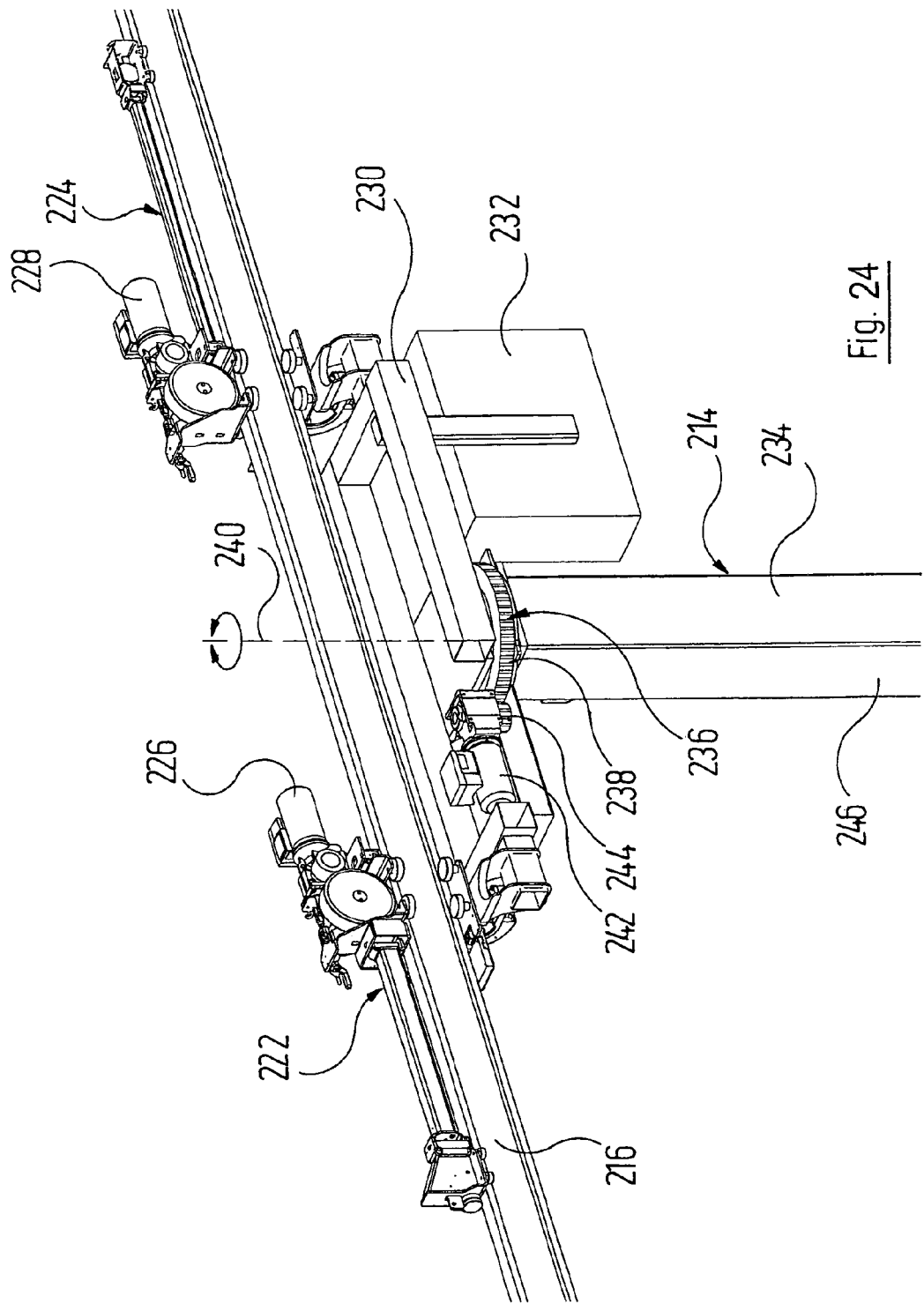
FIG. 24 shows, in perspective and on a larger scale, a detailed view of a drive carriage of the transport carriage as used in the cataphoretic immersion coating system from FIG. 21, in which a mechanism for rotating the telescopic arm is shown.
Figure 25:
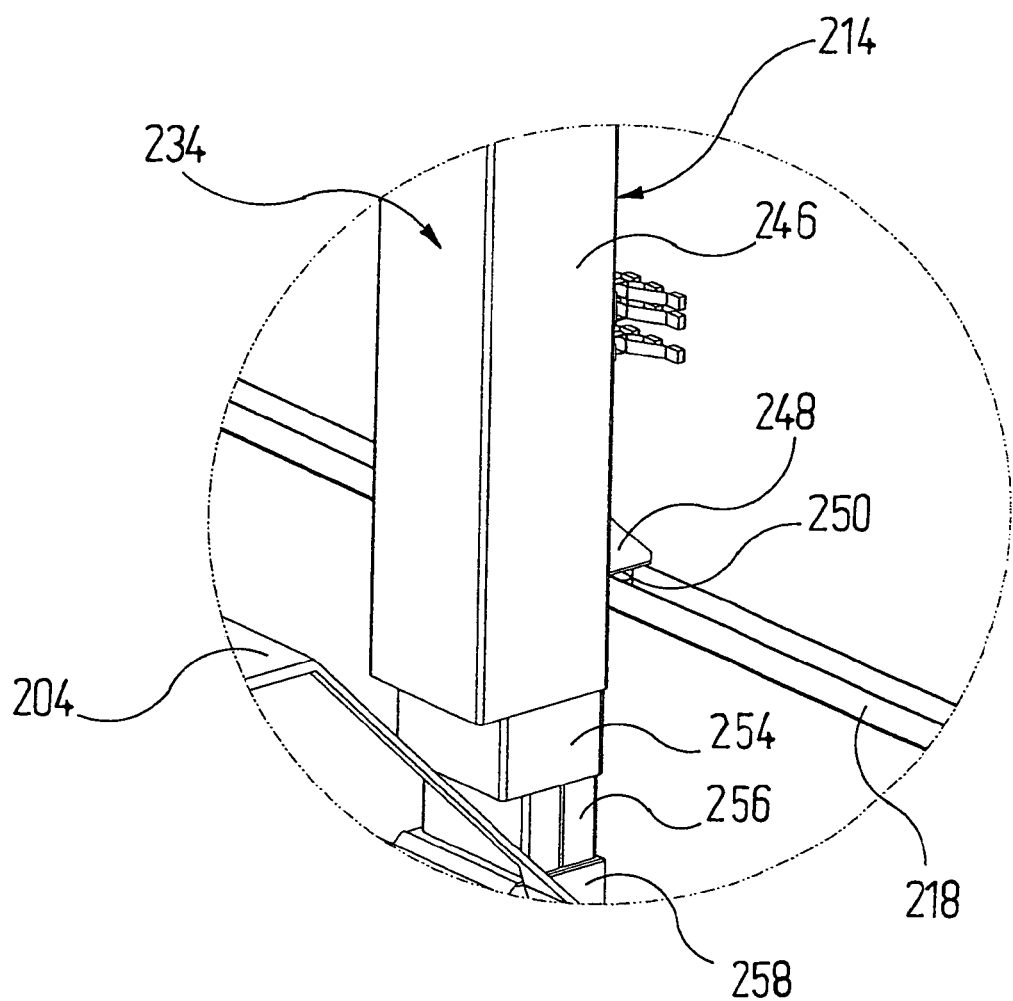
FIGS. 25 and 26 show, in perspective and on a larger scale, a detailed view from different directions of view of a side guide of the telescopic arm.
Figure 26:
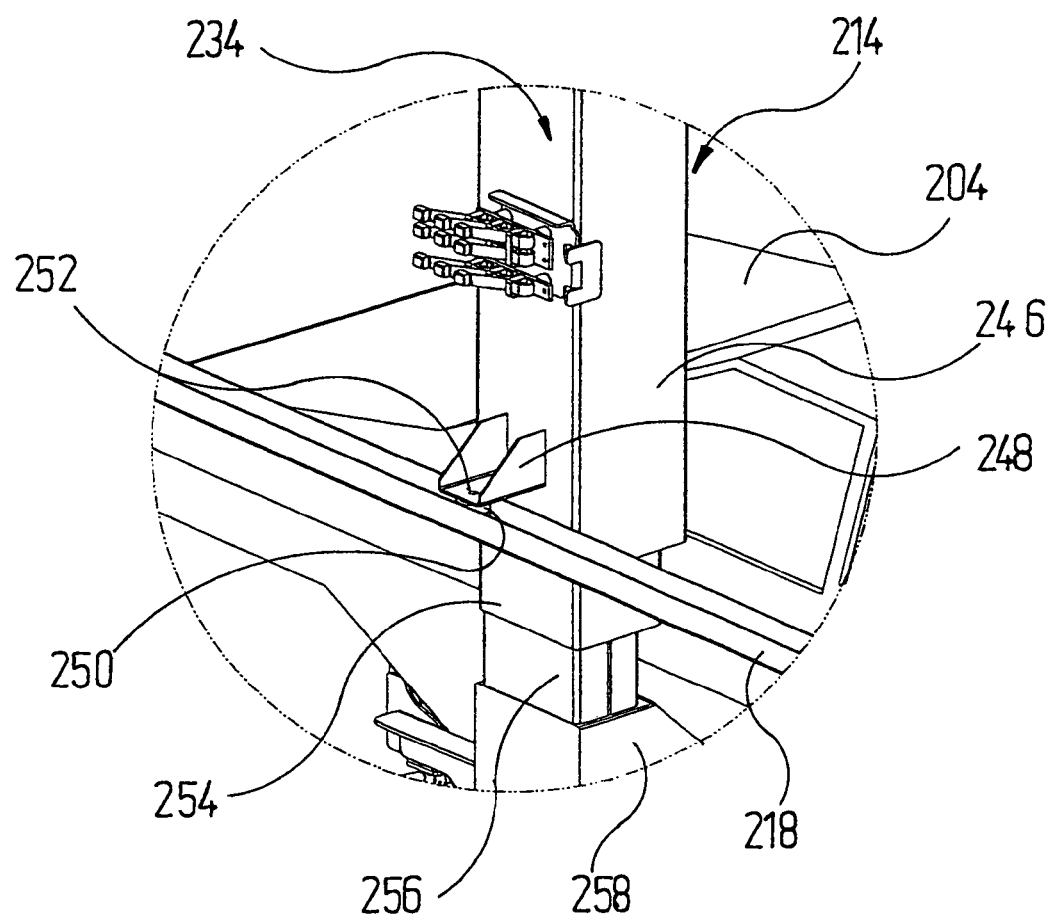

The leader 222 and trailer 224 of each drive carriage 210 are connected to one another by a connection frame 230 which is particularly readily visible in FIGS. 22 to 24.

The connection frame 230, for its part, in known manner carries a control device 232 which can communicate with the central control of the immersion coating system 200 and where appropriate with the control devices 232 of the other drive carriages 210 in the immersion coating system 200. In this way, it is possible to move the different transport carriages 208 largely independently.

The telescopic device 214 which couples the drive carriage 210 to the holding carriage 212 includes a three-part, vertically extending telescopic arm 234 which is variable in length. This is connected at its upper end to the end face of a toothed wheel 236 having an external toothing 238 in such a manner that it cannot rotate in relation thereto, such that the longitudinal axis of the telescopic arm 234 and the axis of rotation 240 of the toothed wheel 236 (cf. FIG. 24) coincide or at least lie closely next to one another. The toothed wheel 236 is for its part mounted rotatably on the connection frame 230, approximately centrally between the leader 222 and the trailer 224, such that the axis of rotation 240 extends vertically.

The toothed wheel 236 can be driven by means of a servo motor 242 which communicates with the control device 232 of the drive carriage 210 and which for this purpose drives a toothed wheel 244 engaging in the external toothing 238 of the toothed wheel 236. In this way, the telescopic arm 234 can be turned about the axis of rotation 240 in either the clockwise or the anticlockwise direction, depending on the direction of rotation of the pinion 244.

The servo motor 242 and the pinion 244 are shown only in FIG. 24, for the sake of clarity, and for this reason the connection frame 230 is partly cut away there.

The telescopic arm 234 includes an upper telescopic part 246. This carries, at its end remote from the toothed wheel 236, and on a transverse crosspiece 248, a guide roller 250 which can turn freely about a vertical axis of rotation 252 and which runs in the U-shaped profile of the guide rail 218, as is in particular visible from FIGS. 25 and 26. In this way, the telescopic arm 234 is prevented from tilting out of the vertical in a plane which is perpendicular to the direction of movement 220.

Besides the upper telescopic part 246, the telescopic arm 234 includes a central telescopic part 254 and a lower telescopic part 256. The telescopic parts 246, 254 and 256 are displaceable in relation to one another, whereof more details will be given below.

The lower telescopic part 256 serves as a slide 256 which is movable inside the central telescopic part 254, and will be designated as such below. In the lower free end region 258 of the slide 256 there is mounted a rotary peg 260. The latter defines a horizontal axis of rotation 262 shown in FIGS. 22 and 23. The rotary peg 260 can be turned in both directions of rotation about the axis of rotation 262 by way of a geared motor 264 (cf. FIG. 27, where the cover is removed) which is entrained by the slide 256 in its lower end region 258 and communicates with the control device 232 of the transport carriage 208.

Figure 27:
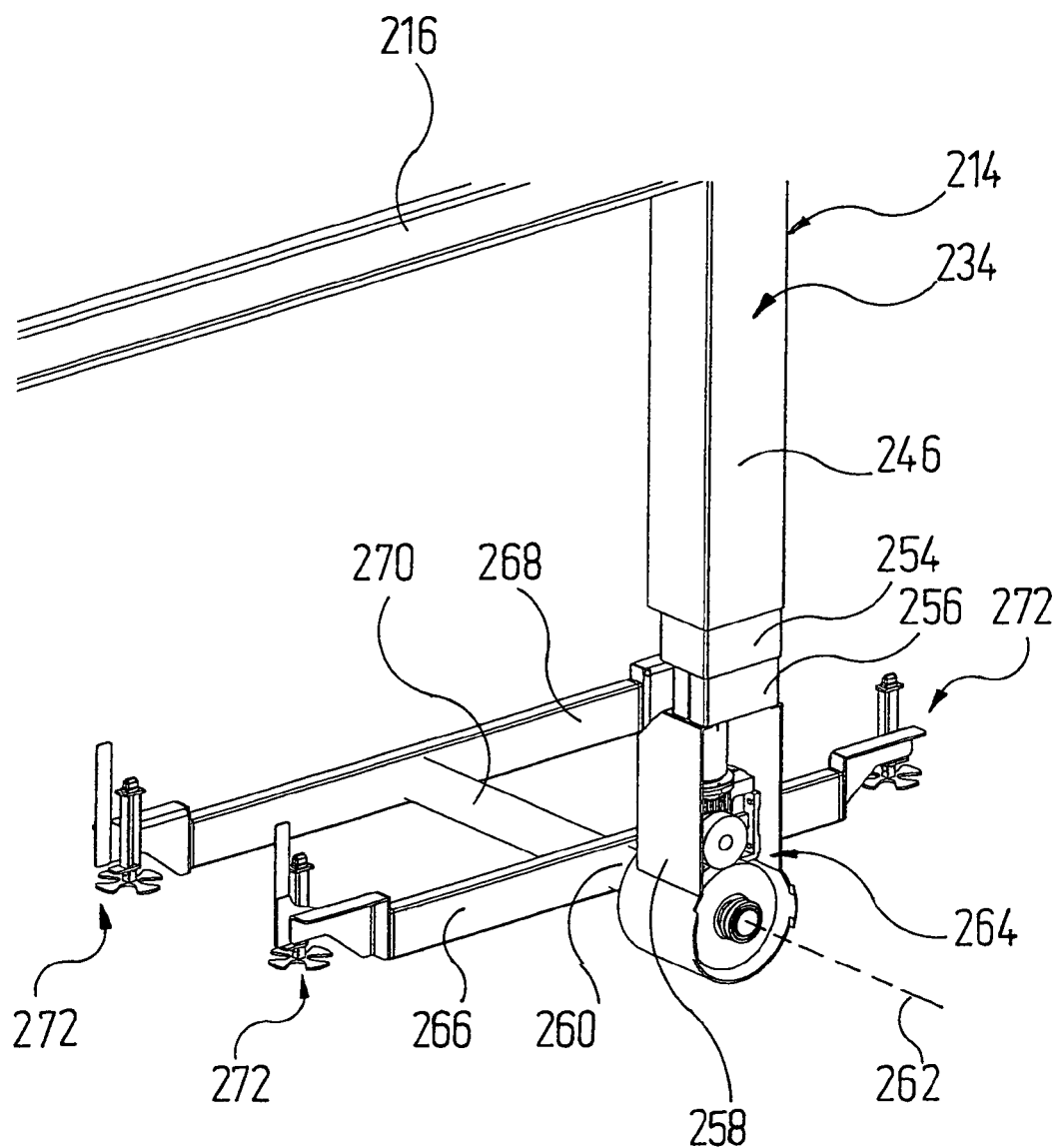
FIG. 27 shows, in perspective, a detailed view on a larger scale of a securing device of the transport carriage as used in the immersion coating system from FIG. 21.

As can in particular readily be seen from FIGS. 22, 23 and 27, the holding carriage 212 has two mutually parallel longitudinal bars 266 and 268 of rectangular cross-section, which are connected centrally by a transverse crosspiece 270 of circular cross-section, and which take the form of hollow profiles. The rotary peg 260 of the slide 256 is connected to the outer surface of the longitudinal bar 266 of the holding carriage 212 such that it cannot rotate in relation thereto, with the rotary peg 260 and the transverse bar 270 of the holding carriage 212 running coaxially with respect to one another. Securing means 272 are mounted on the end sides of the longitudinal bars 266 and 268 and can be used to detachably secure a vehicle body 204 to be coated to the holding carriage 212 in a manner known per se.

Thus, the slide 256 carries the holding carriage 212 by way of the rotary peg 260 only on one side, such that the transport carriage 208 as a whole takes the form of an L-shaped bracket. The transport carriage 208 may be aligned during its movement along the drive rail 216 such that the holding carriage 212, with the securing means 272, is arranged laterally offset from the drive rail 216. This makes it possible to ensure that none of the components of the conveyor system 206, for example the drive rail 216 or the drive carriage 210, among others, is arranged in the space vertically above the holding carriage 212 with the securing means 272. The risk of the vehicle body 204 becoming soiled by dirt such as dust, oil or similar falling off components of the conveyor system 206 is thus reduced.

As mentioned above, the telescopic parts 246, 254 and 256 of the telescopic arm 234 may be moved relative to one another. For this purpose, the cross-sections of the individual telescopic parts 246, 254 and 256 are constructed to complement one another such that the central telescopic part 254 can be displaced in a manner guided inside the upper telescopic part 246 and the slide 256 can be displaced in a manner guided inside the central telescopic part 254.

Figure 28:
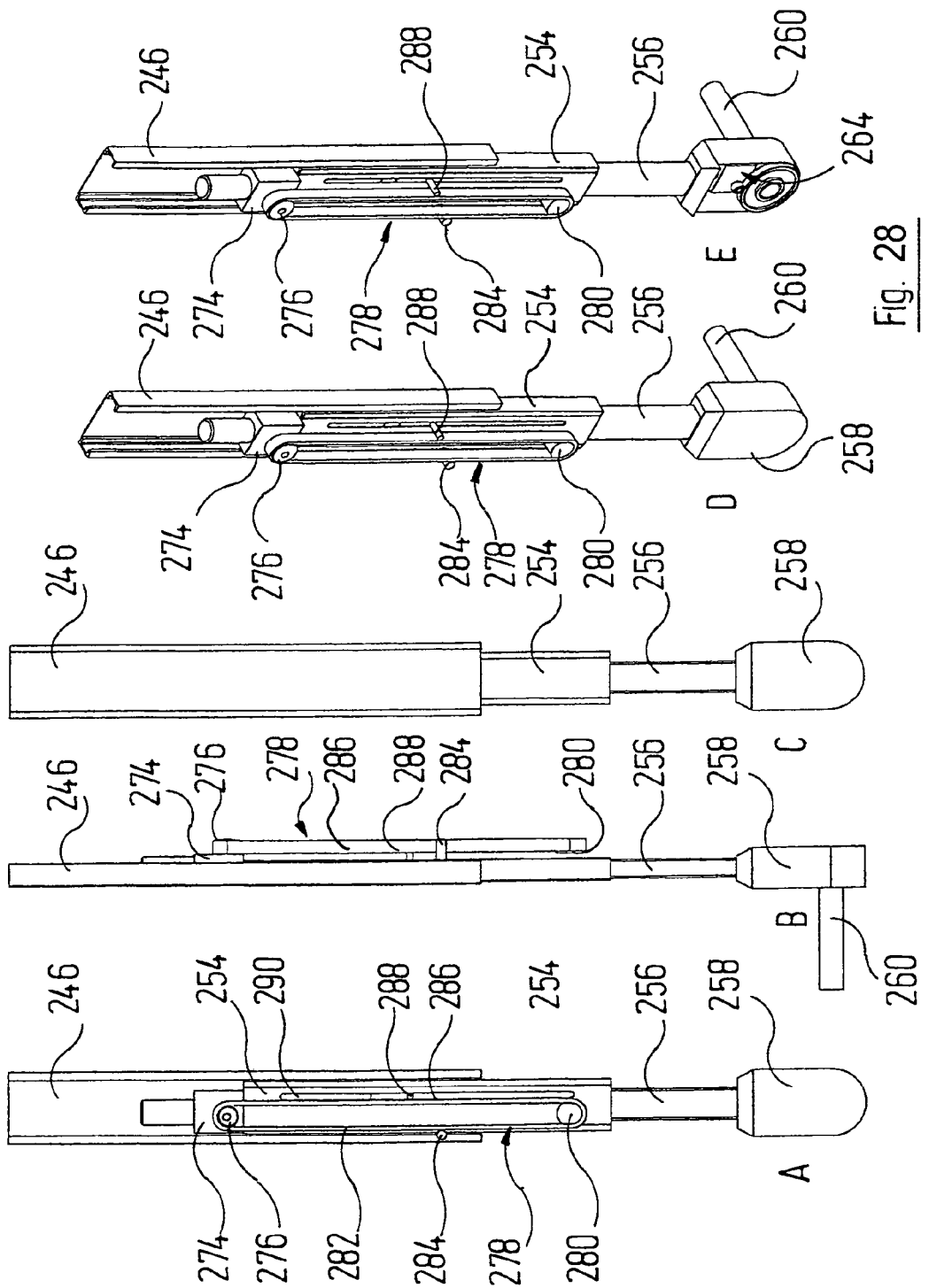
FIGS. 28A to 28E show different views of a first exemplary embodiment of the telescopic arm as used in the transport carriage of the cataphoretic immersion coating system from FIG. 21.

In a first exemplary embodiment of the telescopic arm 234, shown in FIG. 28 in partly cut-away views, the central telescopic part 254 carries at the end face of its upper end, which is always located inside the upper telescopic part 246, a servo motor 274 which communicates with the control device 232 of the transport carriage 208 and can drive a drive pinion 276 in two directions of rotation. A chain 278 runs both over the drive pinion 276 of the servo motor 274 and over a return pinion 280 which is mounted at the lower end of the central telescopic part 254, which projects downwards out of the upper telescopic part 246. The chain 278 is connected, at its side 282 on the left in FIG. 28A, to a connection pin 284 which for its part is attached non-movably to the upper telescopic part 246. The opposite, second side 286 of the chain 278 is coupled to a connection pin 288 which for its part is connected non-movably to the slide 256 of the telescopic arm 234. The connection pin 288 of the slide 256 runs in a slot 290 which is provided in a side wall of the central telescopic part 254, whereas the connection pin 278 of the upper telescopic part 246 is guided laterally past the central telescopic part 254.

When the servo motor 274 is controlled by the control device 232 of the transport carriage 208 such that the drive pinion 276 turns clockwise as seen in FIG. 28A, the connection pin 288 coupled to the slide 256 is entrained downwards by the chain 278 such that the slide 256 is pushed out of the central telescopic part 254. At the same time, the central telescopic part 254 is pushed out of the upper telescopic part 246 because of the non-movable connection pin 284 secured to the upper telescopic part 246. In this way, as a whole the telescopic arm 236 is extended. The telescopic arm 234 can be retracted again by the drive pinion 276 being turned by the servo motor 274 such that it moves anticlockwise as seen in FIG. 28A.

Figure 29:
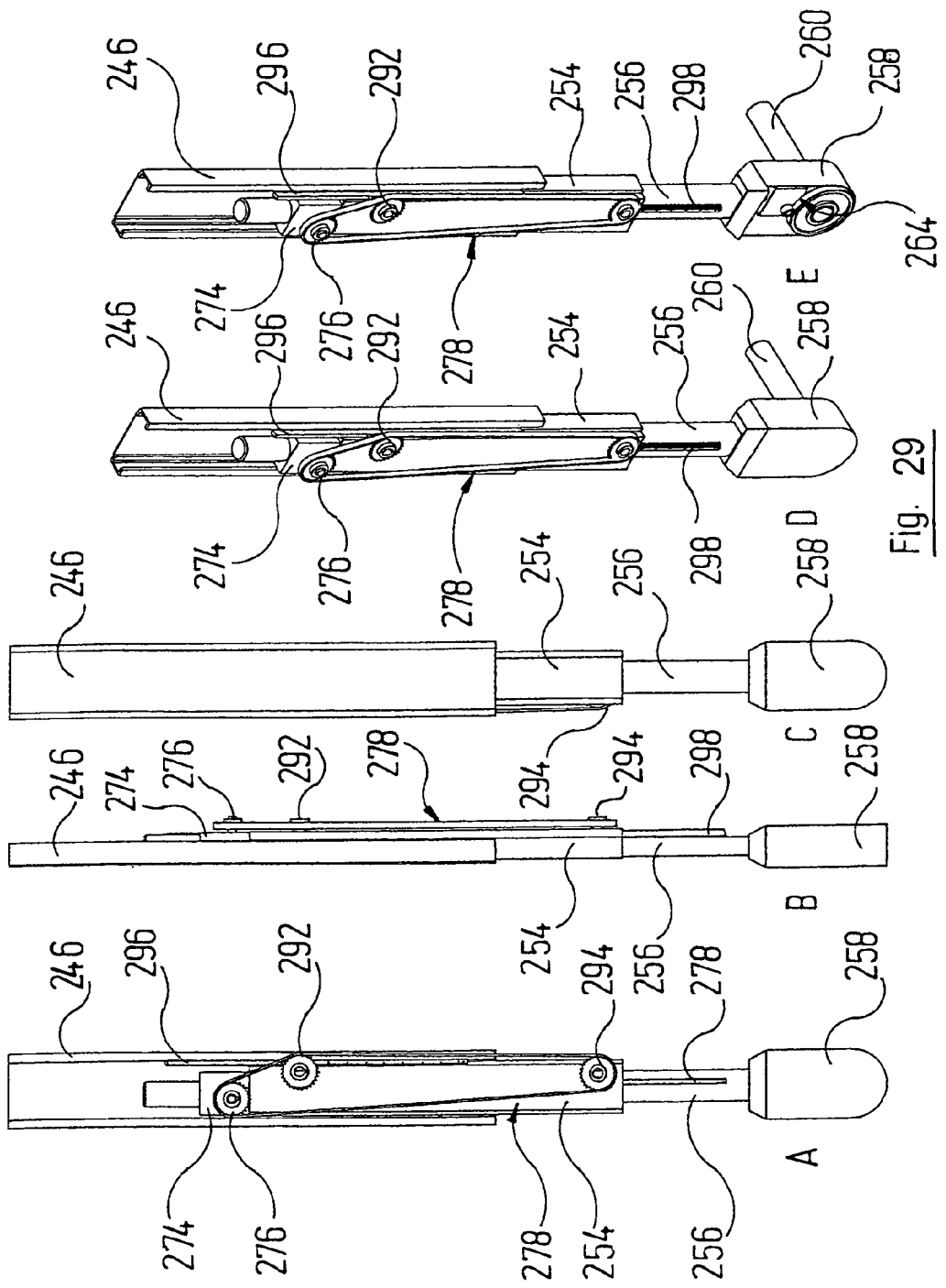
FIGS. 29A to 29E show different views of a second exemplary embodiment of the telescopic arm as used in the transport carriage of the cataphoretic immersion coating system from FIG. 21.

An alternative embodiment of the telescopic arm 234 is shown in FIG. 29 in partly cut-away views. There, the chain 278 runs over the drive pinion 276 of the servo motor 274 and over a first coupling pinion 292 and a second coupling pinion 294. The coupling pinions 292 and 294 each carry a spur wheel in coaxial manner; these are not visible in the views of FIG. 29. The external toothing of the spur wheel on the coupling pinion 292 engages in a toothed rack 296 which is non-movably connected to the upper telescopic part 246 of the telescopic arm 234 and is arranged in the upper region of the central telescopic part 254. The coupling pinion 294, on the other hand, is arranged in the lower region of the central telescopic part 254; the toothing of the spur wheel mounted thereon engages in a toothed rack 298 which is non-movably connected to the slide 256 of the telescopic arm 234. For this purpose, the spur wheel (not visible) on the coupling pinion 294 extends through a side wall of the central telescopic part 254.

When the servo motor 274 is controlled by the control device 232 of the transport carriage 208 such that the drive pinion 276 turns anticlockwise as seen in FIG. 29A, the coupling pinions 292 and 294 are also turned anticlockwise. As a result of the spur wheels secured thereto engaging in the toothed racks 296 and 298 respectively, the central telescopic part 254 of the telescopic arm 234 is pushed out of the upper telescopic part 246 and at the same time the slide 256 is pushed out of the central telescopic part 254.

If the chain pinion 276 is turned clockwise, the slide 256 is retracted into the central telescopic part 254 and at the same time the latter is retracted into the upper telescopic part 246.

In the case of modifications which are not shown here, the raising and lowering movement of the telescopic parts 246 and 254 and the slide 256 may also be brought about by a sliding chain or similar devices.

Operation of the cataphoretic immersion coating system 200 described above is as follows:

The vehicle bodies 204 to be coated are fed in a substantially horizontal alignment in FIG. 21 (cf. arrow 220) from a pre-treatment station in which the vehicle bodies 204 are prepared for the coating operation in known manner by being cleaned, degreased, etc.

For this the slide 256 is moved to its topmost position, in which the telescopic parts 256, 254 and 256 of the telescopic arm 234 are retracted inside one another, such that the latter adopts its smallest possible length. The corresponding position can be seen in perspective in FIG. 30. The drive carriage 210 of the corresponding transport carriage 208 is fed, with the aid of the electric motors 226 and 228, along the drive rail 216 to the immersion bath 202, the associated holding carriage 212 being drawn along by way of the telescopic device 214. During this, the guide roller 250 rolls on the upper telescopic part 246 of the telescopic arm 234, in the U-shaped profile of the guide rail 218, although this does not serve to support the weight. The weight of the transport carriage 208 and the vehicle body 204 secured thereto is entirely carried by the drive rail 216 by way of the drive carriage 210.

When the transport carriage 208 approaches the end wall of the immersion bath 202 that is on the entry side, the slide 256 carrying the vehicle body 204 by way of the transport carriage 208 is progressively lowered by the telescopic arm 234 being extended in the manner described above with the aid of the servo motor 274. As soon as the front end of the vehicle body 204 projects beyond the end wall of the immersion bath 202 into the interior of the immersion bath 202, the rotary peg 260 and hence the holding carriage 212 with the securing means 272 and the vehicle body 204 secured thereto are simultaneously turned with the aid of the geared motor 264 about the axis of rotation 262. Thus, in this region the overall movement of the vehicle body 204 can be regarded as the superposition of three movements, namely a horizontal linear movement (arrow 220) along the drive rail 216, a vertical linear movement along the axis of rotation 240 and hence also along the longitudinal axis of the telescopic arm 234, and a rotary movement, clockwise as seen in FIG. 21, about the axis of rotation 262 of the rotary peg 260. During this the vehicle body 204 is "wound" over the end wall of the immersion bath 202 on the entry side. The corresponding position is illustrated in perspective in FIG. 31.

Figure 32:
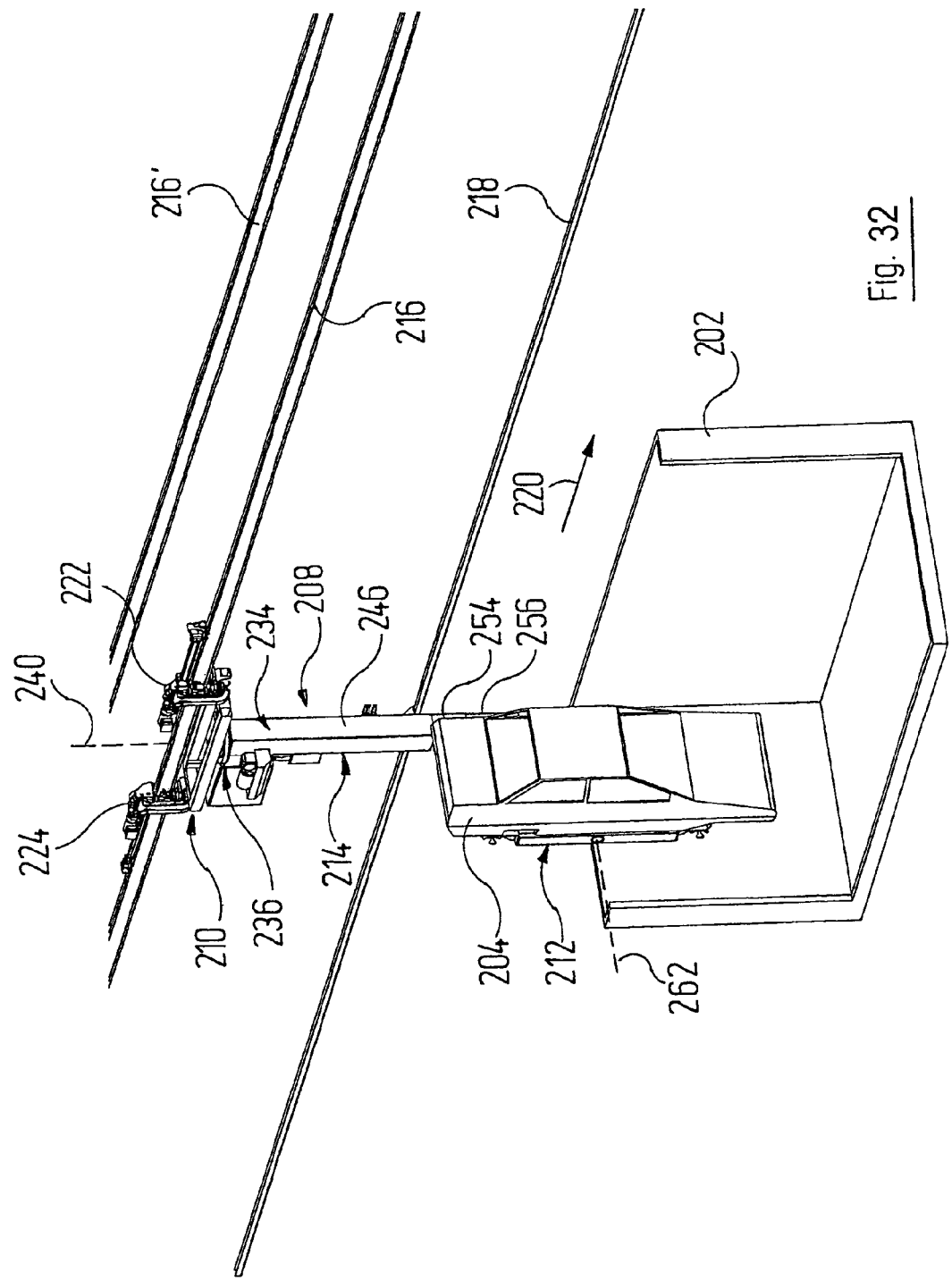
Figure 33:
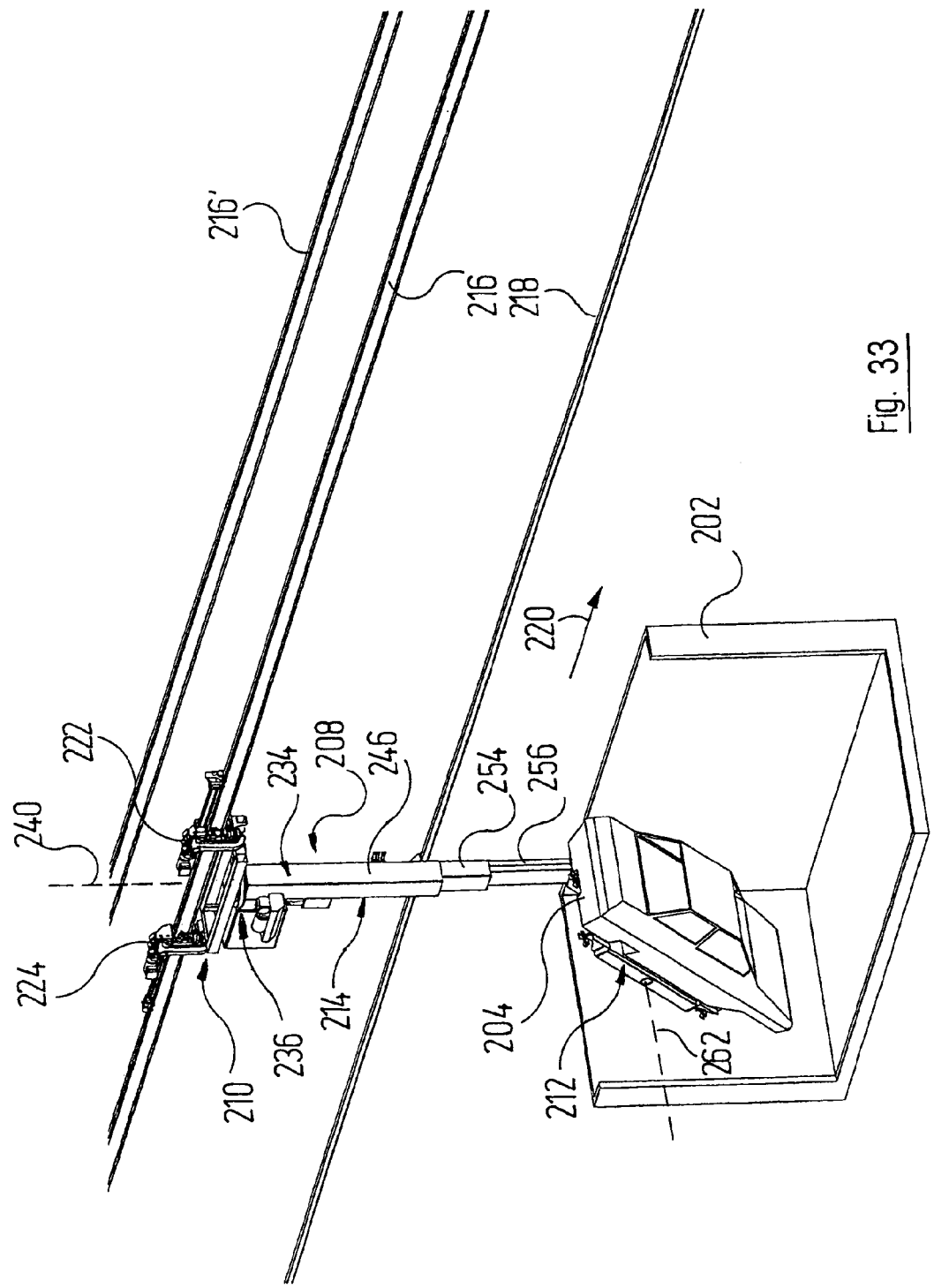

As the slide 256 continues to be lowered and the vehicle body 204 continues to be rotated about the axis of rotation 262 of the rotary peg 260, a position is finally reached in which the vehicle body 204 is substantially vertical, as illustrated in FIG. 32. Here, the vehicle body 204 is still relatively close to the end wall of the immersion bath 202 on the entry side. As the transport carriage 208 continues to move and hence the spacing between the centre of the vehicle body 204 and the end wall of the immersion bath 202 on the entry side grows, the rotary peg 260 and hence the vehicle body 204 are turned further clockwise, such that the vehicle body 204 begins to lie on its back, and this is illustrated in FIG. 33. The speed of movement in the horizontal direction and the speed of rotation can in this case be matched to one another such that the front end of the vehicle body 204 maintains approximately the same spacing from the end wall of the immersion bath 202 on the entry side during this immersion movement.

Figure 34:
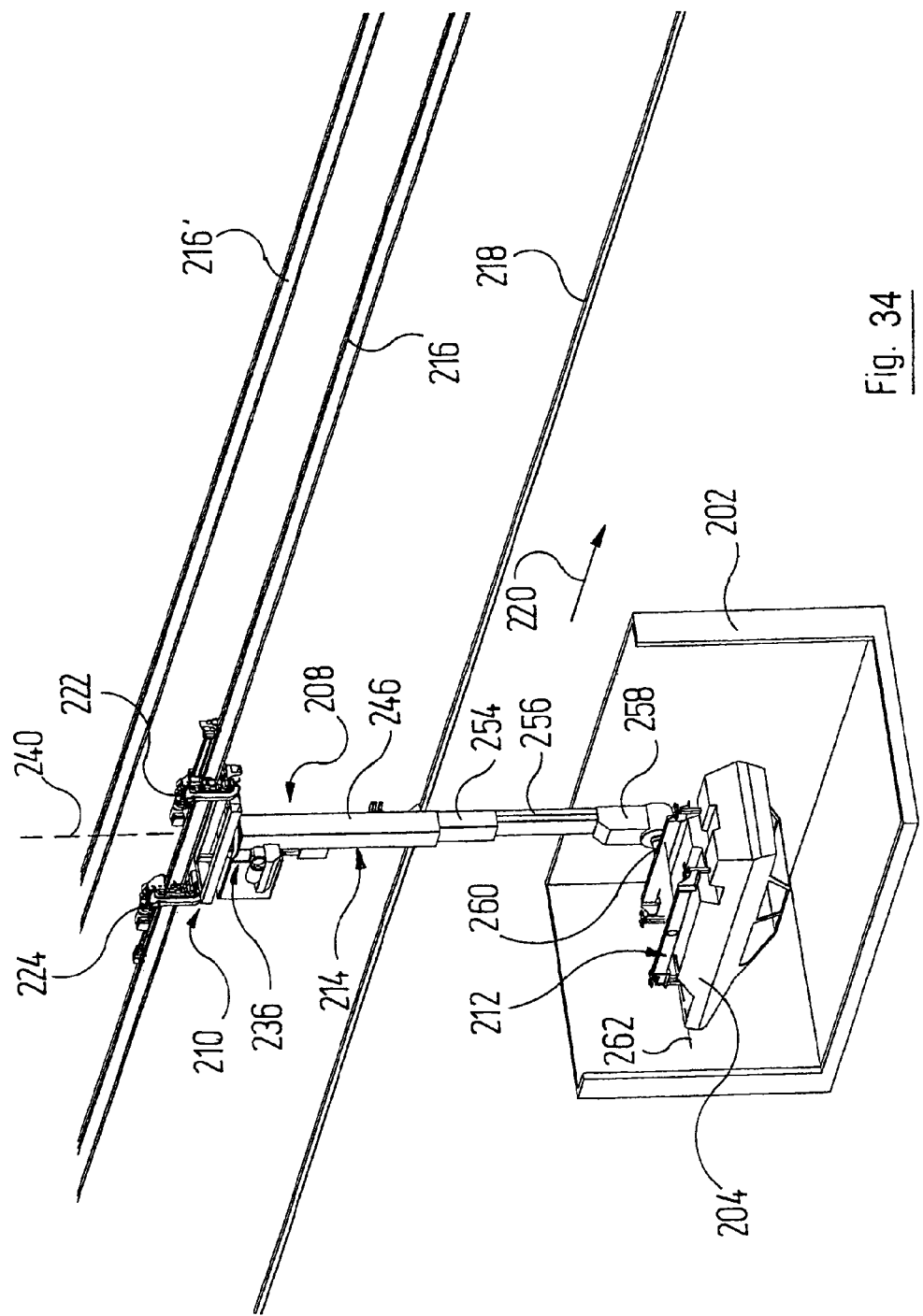

At the latest at the point at which the vehicle body 204 is completely on its "back" and hence lies horizontal again, as illustrated in FIG. 34, the vehicle body 204 is completely immersed in the liquid paint. The vehicle body 204 is conveyed further through the immersion bath 202, at first in this position, with the aid of the transport carriage 208 until it has come closer to the end wall of the immersion bath 202 on the exit side.

Figure 35:
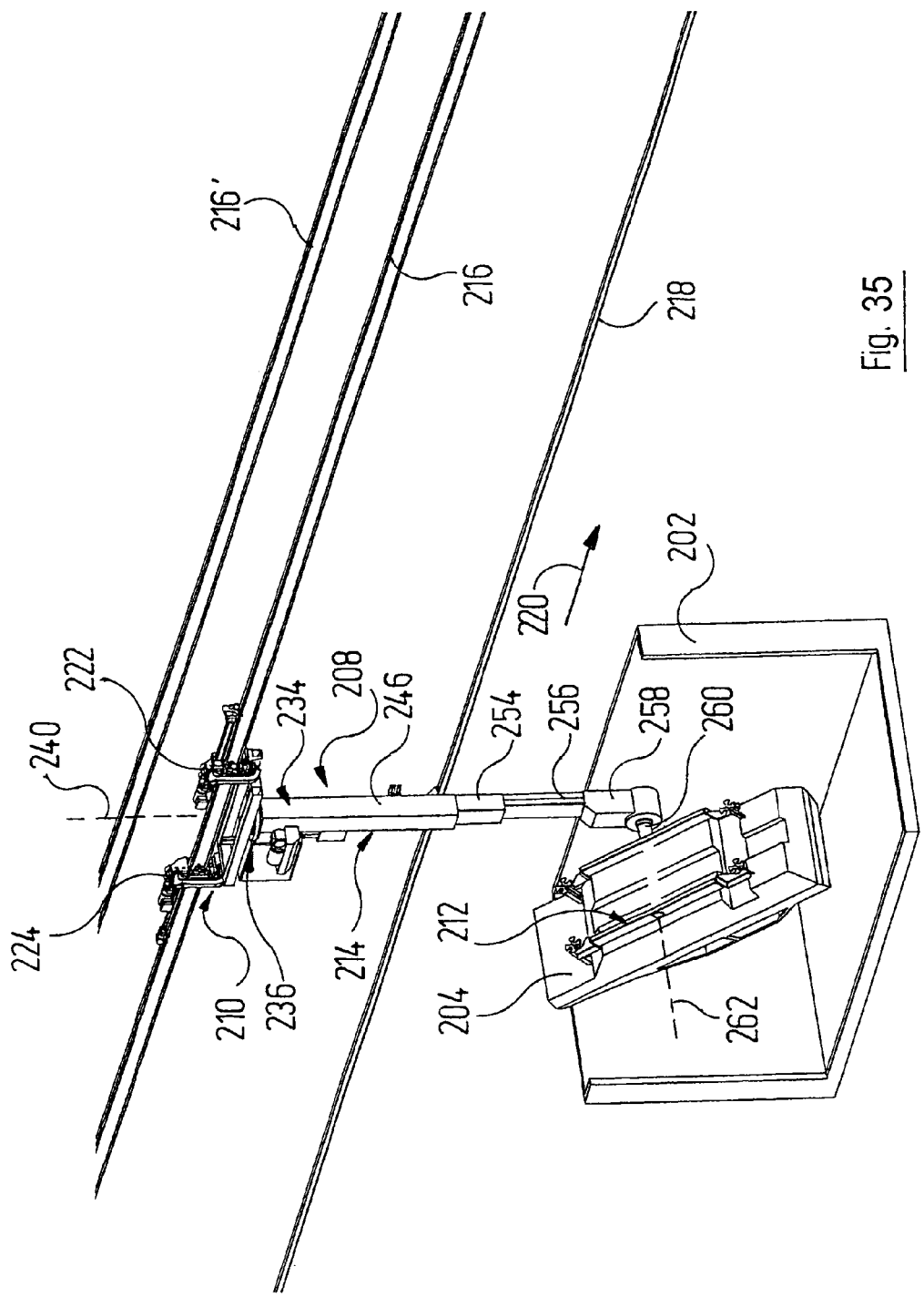
Figure 36:
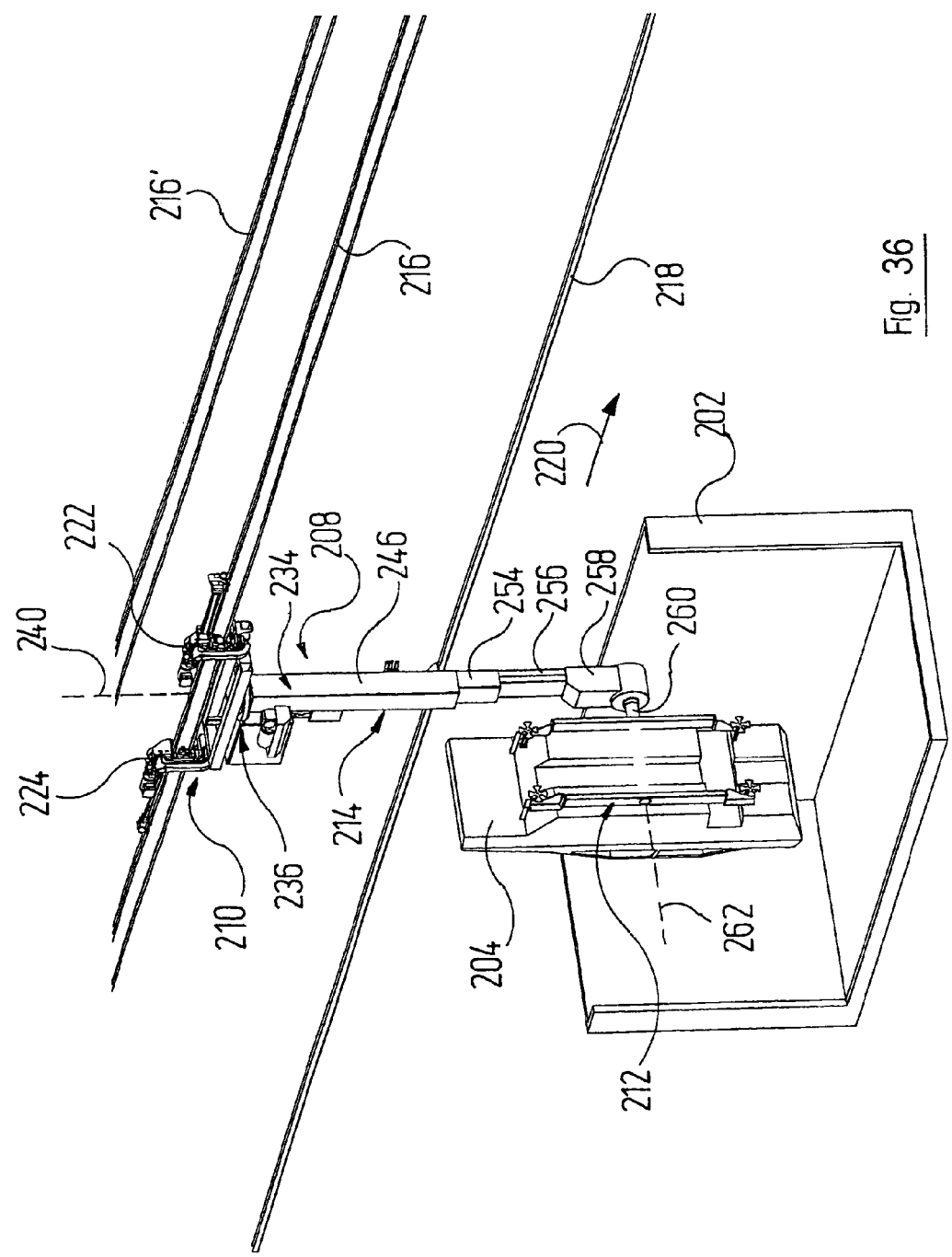
Figure 37:
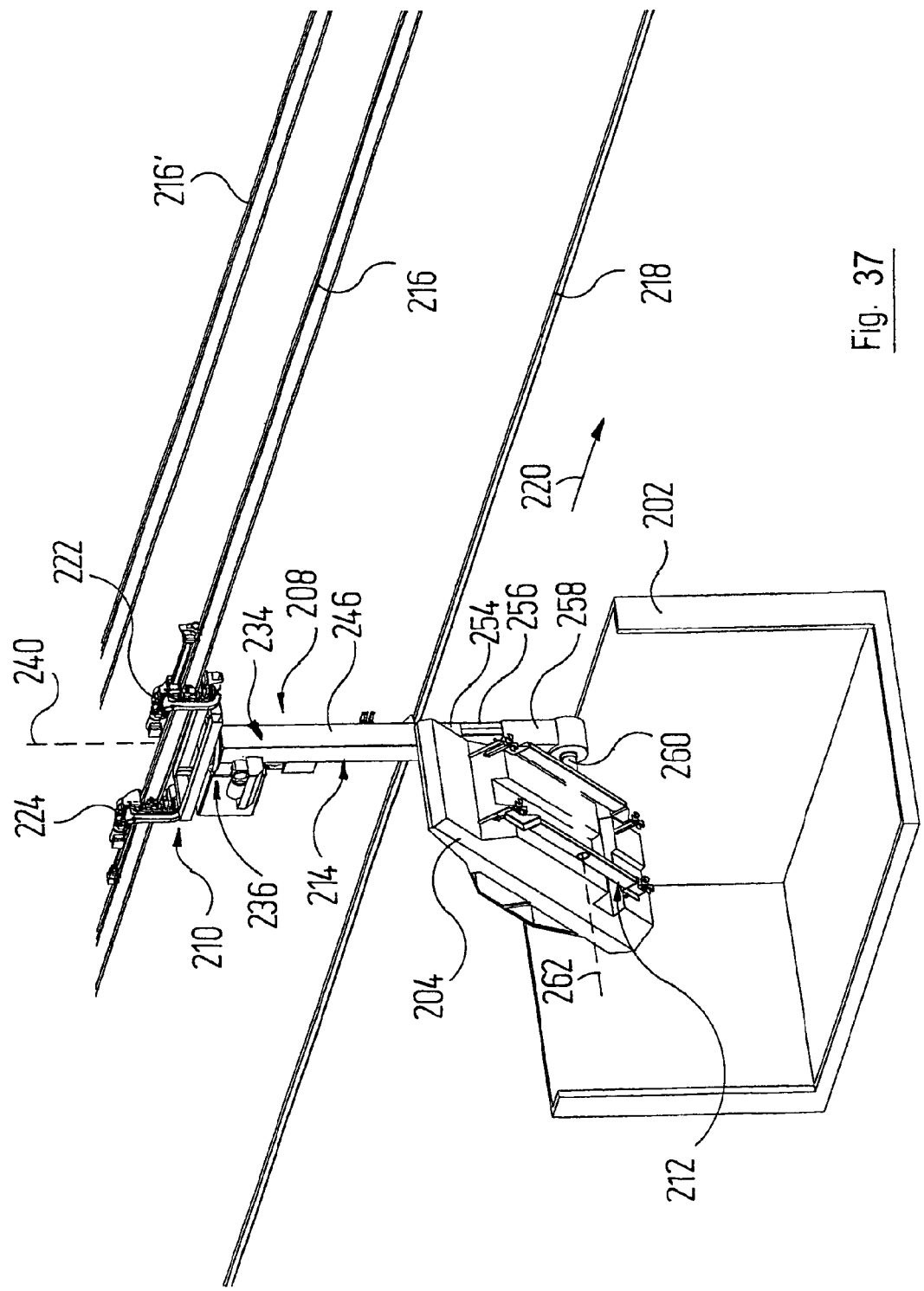
Figure 38:
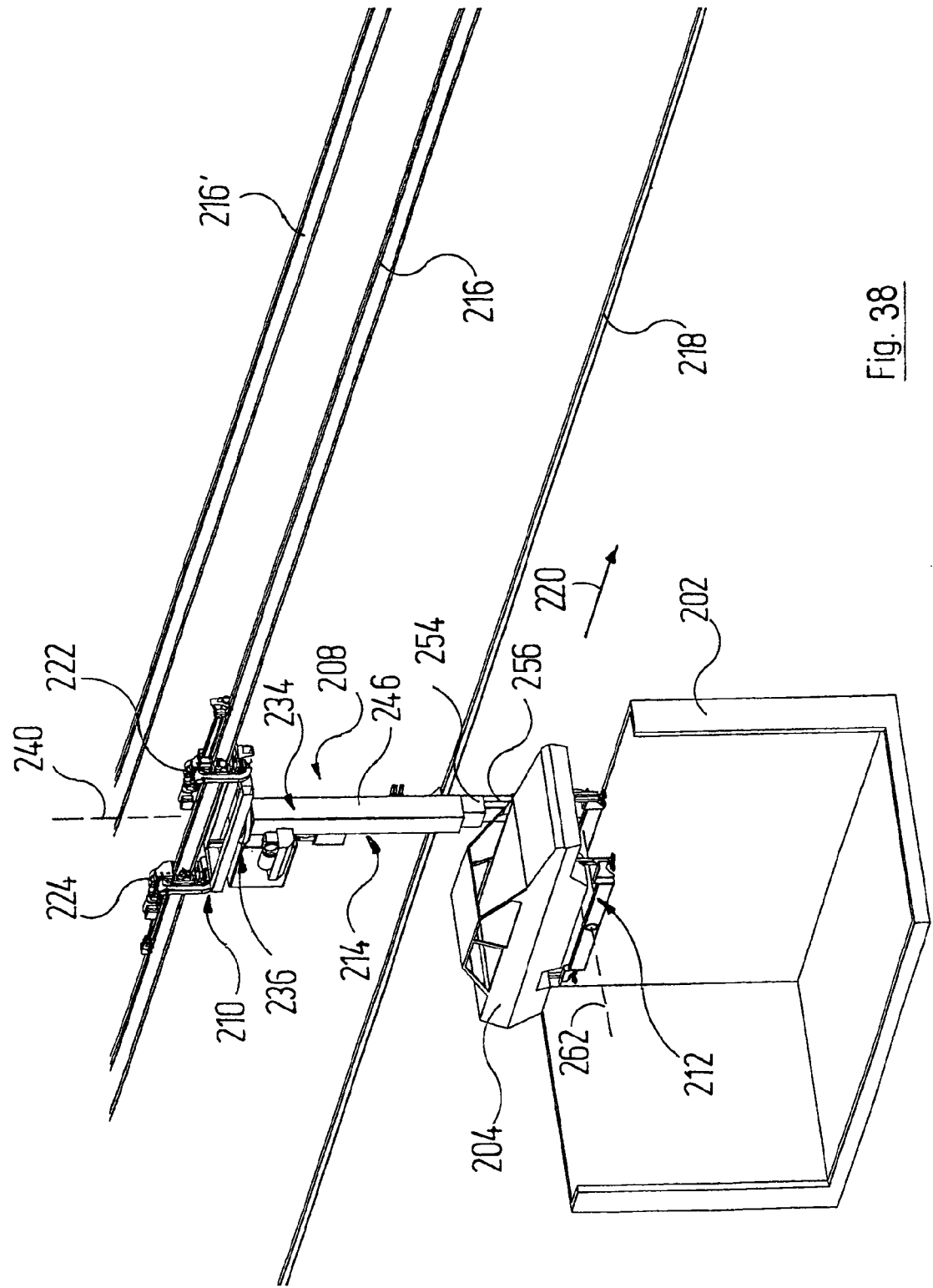

Then, the procedure of emergence of the vehicle body 204 from the bath begins. This procedure can once again be regarded as the superposition of three movements, namely the horizontal linear movement in the direction of conveying 220, the vertical movement along the axis of rotation 240 and hence also along the longitudinal axis of the telescopic arm 234, and the rotary movement about the axis of rotation 262 of the rotary peg 260. First the vehicle body 204, as illustrated in FIGS. 35 and 36, is set vertical by the rotary peg 260 continuing to turn clockwise. Then the vehicle body 204 is "wound" by the telescopic arm 234 being retracted and hence by an upward movement of the slide 256 and a continuation of the rotary movement up over the end wall of the immersion bath 202 on the exit side (cf. FIG. 27), until a horizontal position of the freshly painted vehicle body 204 is reached again in the direction of conveying 220 downstream of the immersion bath 202, as illustrated in FIG. 38.

The immersion coating system 200 described may also be used to immersion coat relatively small objects (small articles). For this, holding baskets for example (not themselves shown) containing objects to be coated, which are small parts (not illustrated), loosely piled together for example, are secured to the holding carriage 212. It will be appreciated that holding baskets of this kind are not guided through the immersion bath 202 in a position in which their loading opening points downwards and objects to be coated could fall out.

As mentioned above, the telescopic arm 234 may be turned about the vertical axis of rotation 240 by way of the servo motor 242. In the kinematic arrangement shown in FIGS. 21 and 30 to 38, the telescopic arm 234 adopts a position in respect of its vertical axis of rotation 240 in which the rotary peg 260 is aligned on the slide 256 such that its horizontal axis of rotation 262 is perpendicular to the direction of movement 220. The telescopic arm 234 is held in this position by an appropriate locking of the servo motor 242.

Figure 30:
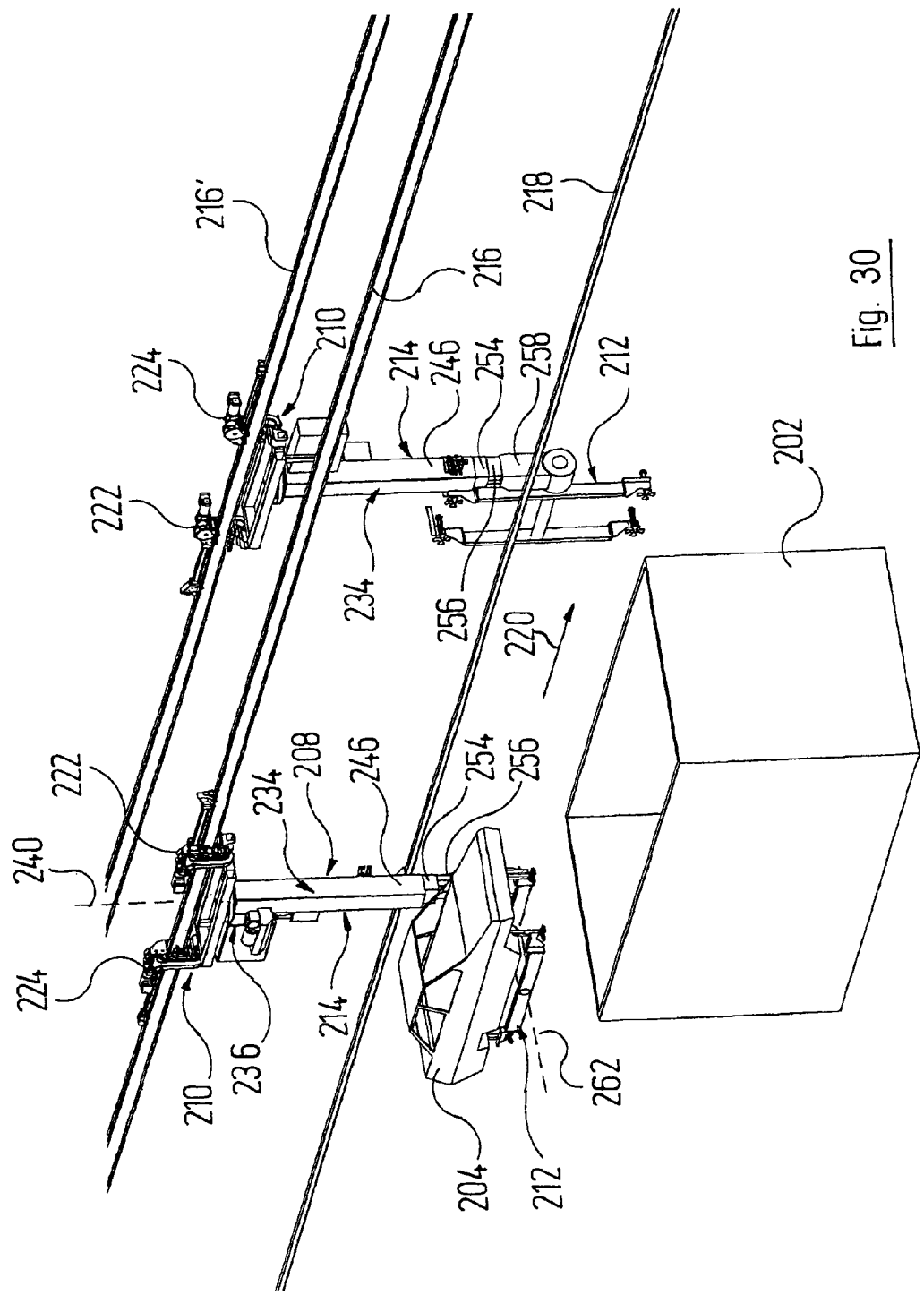
FIGS. 30 to 38 show phases in the immersion of a vehicle body in the immersion bath of the cataphoretic immersion coating system from FIG. 21, from different perspectives.
Figure 31:
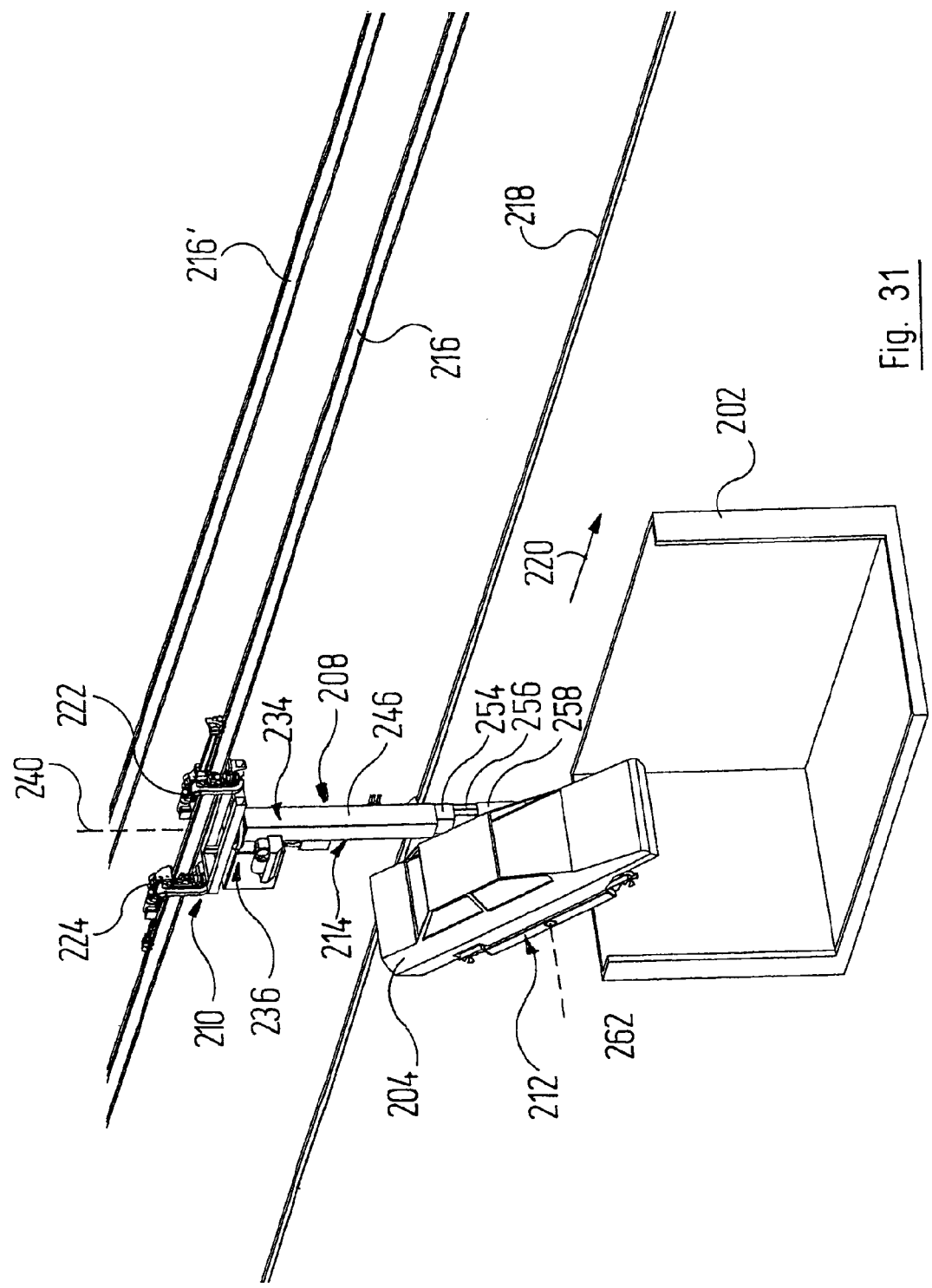

The fact that the telescopic arm 234 can be turned about the vertical axis of rotation 240 only becomes relevant, in the kinematic arrangement shown in FIGS. 21 and 30 to 38, once the vehicle bodies 204 have left the immersion bath 202 and are removed from the transport carriages 208 for further processing. The transport carriages 208 then have to be guided back to the entry of the immersion coating system 200 so that they can be laden again there with vehicle bodies 204 which have yet to be coated. For this purpose, the transport carriage 212 is turned in relation to the connection frame 230 of the drive carriage 210 about the vertical axis of rotation 240 until the rotary peg 260 on the slide 256 is aligned parallel with the direction of movement 220, by the servo motor 242 being actuated and this turning the toothed wheel 236 on the upper telescopic part 246 of the telescopic arm 234. Moreover, the holding carriage 212 is brought by a corresponding rotation of the rotary peg 260 by way of the geared motor 264 into a position in which its longitudinal bars 266 and 268 are vertical. This position is shown in FIGS. 22 and 23. In FIG. 30, a transport carriage 208 can be seen which is guided back to the entry of the immersion coating system 200 in this "return position" on a drive rail 216' which runs parallel to the drive rail 216 and is connected thereto by way of a curved rail part (not visible).

It is also possible for the transport carriage 208 to be transferred from the drive rail 216 to the drive rail 216' by means of a transverse displacement without the need for a curved rail part connecting the drive rails 216, 216'.

As a result of rotating the holding carriage 212, and as a result of its vertical position in relation to the drive carriage 210, the space required for the transport carriage 208 on the return path from the exit of the immersion coating system 200 to the entry thereof is reduced.

The sequence of movements of the vehicle body 204, described above with reference to FIGS. 30 to 38, as it passes through the immersion bath 202 is merely one example. The structural construction of the transport carriage 208 allows a number of other kinematic arrangements which can respectively be adapted to the type of vehicle body 3. For example, the vehicle body 204 may also be guided through the immersion bath 202 "roof upwards".

As an alternative, it is possible for the axis of rotation 262 of the holding carriage 212 to be guided just above the liquid level of the liquid in the immersion bath 202. In this case, the vehicle body will be guided through the immersion bath 202 "roof downwards". Here, it is possible to prevent either the holding carriage 212 or the slide 256 from coming into contact with liquid in the bath, as a result of which the risk that liquid in the bath will be transferred from one immersion bath to the next, or that lubricant will be introduced into the immersion baths, is reduced.

It is for example also possible to make use of the further degree of freedom which is provided by the vertical axis of rotation 240 if the vehicle body 204 is guided through the immersion bath 202. In this case, with appropriate dimensions of the immersion bath 202, a vehicle body 204 may also be guided through this transversely and not in the longitudinal direction as illustrated in FIGS. 30 to 38. It is also possible to rotate the telescopic arm 234 about the vertical axis of rotation 240 far enough for the rotary peg 260 or the axis of rotation thereof 262 to form an angle of between 0 and 90° with the direction of movement 220. It is also possible for the telescopic arm 234 to be rotated back and forth about the vertical axis of rotation 240 while the vehicle body 204 is guided through the immersion bath 202, as a result of which a "rolling" motion of the vehicle body 204 in the immersion bath 202 can be achieved.

It is thus possible for the vehicle body 204 to perform a sequence of movements which can be regarded as the superposition of four movements, namely a horizontal linear movement (corresponding to the direction of movement 220), a vertical linear movement along the axis of rotation 240 and hence along the longitudinal axis of the telescopic arm 234, a rotary movement about the horizontal axis of rotation 262 of the rotary peg 260, and a rotary movement about the vertical axis of rotation 240 of the telescopic arm 234.

The conveyor system 206, which takes the form of an overhead conveyor system, requires no further structures to the right and/or left of the immersion bath 202, as are required in systems of different design. This means that the immersion coating system 200 can be kept relatively narrow overall.

Moreover, as a result of the lateral mounting of the holding carriage 212, no shadows are cast on the vehicle body 204 by further components of the transport carriage 208 which would have to be compensated for in the immersion bath in a correspondingly complex manner by a suitable kinematic arrangement and/or a relatively long dwell time in the immersion bath.

When the vehicle body 204 is guided through the immersion bath, the lower end region 258 of the slide 256 carrying the horizontal rotary peg 262 is lowered into the liquid in the bath. This means that the horizontal axis of rotation 260 may be arranged close to the centre of gravity of the vehicle body 204 supported by the holding carriage 212. This results in a more favourable distribution of forces during the sequence of movements for the vehicle body than is the case in known systems in which the axis of rotation lies relatively far away from the centre of gravity of the vehicle body.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. An immersion treatment system, comprising:
at least one immersion bath which can be filled with a treatment liquid and in which vehicle bodies can be completely immersed;
a conveyor system which can bring the vehicle bodies to be treated to the immersion bath, put them into the interior of the immersion bath, take them out of the immersion bath and move them away therefrom and which includes at least one transport carriage which has a securing device that can be rotated about an axis of rotation and to which at least one vehicle body may be secured;
wherein, the transport carriage includes a vertically movable slide on which a component that defines the axis of rotation is mounted, such that overall for the at least one vehicle body it is possible to achieve a movement sequence, which is a superposition of a horizontal linear movement, a vertical linear movement and a rotary movement about the axis of rotation, while the at least one vehicle body passes through the immersion bath.

2. The immersion treatment system of claim 1, wherein the transport carriage includes:
a) a drive carriage which may be moved by a motor on a drive rail;
b) a holding structure which is coupled to the drive carriage and to which the slide is secured.

3. The immersion treatment system of claim 2, wherein the drive rail and the drive carriage are constructed in the manner of a conventional electric overhead conveyor.

4. The immersion treatment system of claim 2, wherein the holding structure is a holding carriage which has a guide frame that is guided on at least one guide rail extending in the direction of movement.

5. The immersion treatment system of claim 2, wherein the drive carriage has at least one winding reel which may be rotated by a motor and onto or off which at least one flexible drawing means may be wound or unwound, the lower end of this flexible drawing means being connected to the vertically movable slide.

6. The immersion treatment system of claim 5, wherein the flexible drawing means is a carrying belt.

7. The immersion treatment system of claim 5, wherein the flexible drawing means is a chain.

8. The immersion treatment system of claim 7, wherein the flexible chain is constructed such that it stiffens under pressure, with the result that it can transfer pressure forces.

9. The immersion treatment system of claim 2, wherein the holding structure has on a part which is not vertically movable at least one winding reel which may be rotated by a motor and onto or off which at least one flexible drawing means may be wound or unwound, the lower end of this flexible drawing means being connected to the vertically movable slide.

10. The immersion treatment system of claim 2, wherein the holding structure takes the form of a telescopic device which may be retracted or extended in the vertical direction and which guides the slide.

11. The immersion treatment system of claim 1, wherein a motor by means of which the component that defines the axis of rotation may be rotated is arranged on the slide and is movable jointly therewith.

12. The immersion treatment system of claim 1, wherein the securing device is rotatable in relation to the transport carriage about a substantially vertical axis.

13. The immersion treatment system of claim 12, wherein at least one guide rail which cooperates with a guide member provided on the transporter carriage runs along a return path of the transport carriages from the exit to the entry of the immersion treatment system.

14. The immersion treatment system of claim 13, wherein the transport carriage is set up such that the securing device may be conveyed laterally offset from the rail, at least along a section of the rail.

15. The immersion treatment system of claim 14, wherein the securing device includes a holding structure with securing means which is carried only by way of a side surface of a further component of the transport carriage.

16. The immersion treatment system of claim 14, wherein securing means are provided which secure the transport carriage to prevent tipping about a tilt axis parallel to the rail.

17. The immersion treatment system of claim 16, wherein the securing means include a support structure which is arranged parallel to and below the rail and which supports the transporter carriage.

18. The immersion treatment system of claim 16, wherein the securing means include a guide roller which is mounted on the transport carriage, is rotatable about a vertical axis of rotation and is guided in a guide rail that is complementary thereto, with the guide rail running below the drive rail and parallel thereto.

* * * * *